(12) United States Patent
Kobayashi et al.

(10) Patent No.: US 6,963,331 B1
(45) Date of Patent: Nov. 8, 2005

(54) POSITION INFORMATION INPUT APPARATUS AND METHOD

(75) Inventors: Katsuyuki Kobayashi, Yokohama (JP); Masahide Hasegawa, Yokohama (JP); Kiwamu Kobayashi, Yokohama (JP); Masaaki Kanashiki, Yokohama (JP); Atsushi Tanaka, Yamato (JP); Yuichiro Yoshimura, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,021

(22) Filed: Mar. 14, 2000

(30) Foreign Application Priority Data

| Mar. 17, 1999 | (JP) | ................................. 11-072542 |
| Mar. 31, 1999 | (JP) | ................................. 11-091565 |
| Mar. 7, 2000 | (JP) | ............................ 2000-062272 |

(51) Int. Cl.$^7$ ............................................. G09G 5/08
(52) U.S. Cl. ..................................... 345/158; 353/122
(58) Field of Search ............................... 345/157, 156, 345/179–183, 158, 169; 353/122; 348/207, 348/88

(56) References Cited

U.S. PATENT DOCUMENTS

| 5,097,780 A | | 3/1992 | Winchester ................. 114/330 |
| 5,341,155 A | * | 8/1994 | Elrod et al. .................. 345/179 |
| 5,484,967 A | | 1/1996 | Yanagisawa et al. .... 178/18.04 |
| 5,504,501 A | * | 4/1996 | Hauck et al. ................ 345/158 |
| 5,684,277 A | | 11/1997 | Tokioka et al. .......... 178/18.04 |
| 5,712,658 A | * | 1/1998 | Arita et al. ................. 345/158 |
| 5,744,760 A | | 4/1998 | Kobayashi et al. ...... 178/19.02 |
| 5,793,361 A | * | 8/1998 | Kahn et al. .................. 345/179 |
| 5,831,614 A | * | 11/1998 | Tognazzini et al. ......... 345/784 |
| 6,028,595 A | * | 2/2000 | Shiga .......................... 345/173 |
| 6,050,690 A | * | 4/2000 | Shaffer et al. .............. 353/122 |
| 6,081,255 A | * | 6/2000 | Narabu ....................... 345/158 |

FOREIGN PATENT DOCUMENTS

| JP | 6-274266 | 9/1994 |
| JP | 7-76902 | 3/1995 |
| WO | WO 89/0701 | 8/1989 |

* cited by examiner

Primary Examiner—Xiao Wu
Assistant Examiner—Kevin M. Nguyen
(74) Attorney, Agent, or Firm—Fitzpatrick, Cella, Harper & Scinto

(57) ABSTRACT

The invention aims to provide a coordinate input apparatus having high detection reliability and high efficiency and to control the influence of ambient light using a simple structure. The apparatus detects a light spot flashing on and off in a predetermined cycle and incident at a desired position on a coordinate input screen, and includes a detection device having photoelectric conversion elements corresponding to N pixels for detecting a light spot coordinate. The difference between signals from photoelectric elements in light emission state and in light non-emission state at each N pixel is found, and the smaller of the difference signals of the m-th pixel having the maximum difference signal is set as a threshold value. Effective pixels are identified based on the threshold value, and the coordinate is calculated by using the difference data of the selected effective pixels.

20 Claims, 23 Drawing Sheets

FIG.3

| SWITCH A | SWITCH B | SWITCH C | SWITCH D | LIGHT EMISSION | PEN DOWN | PEN BUTTON |
|---|---|---|---|---|---|---|
| × | × | – | – | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | – | – | ON | ON | ON |
| × | ○ | – | – | ON | ON | OFF |

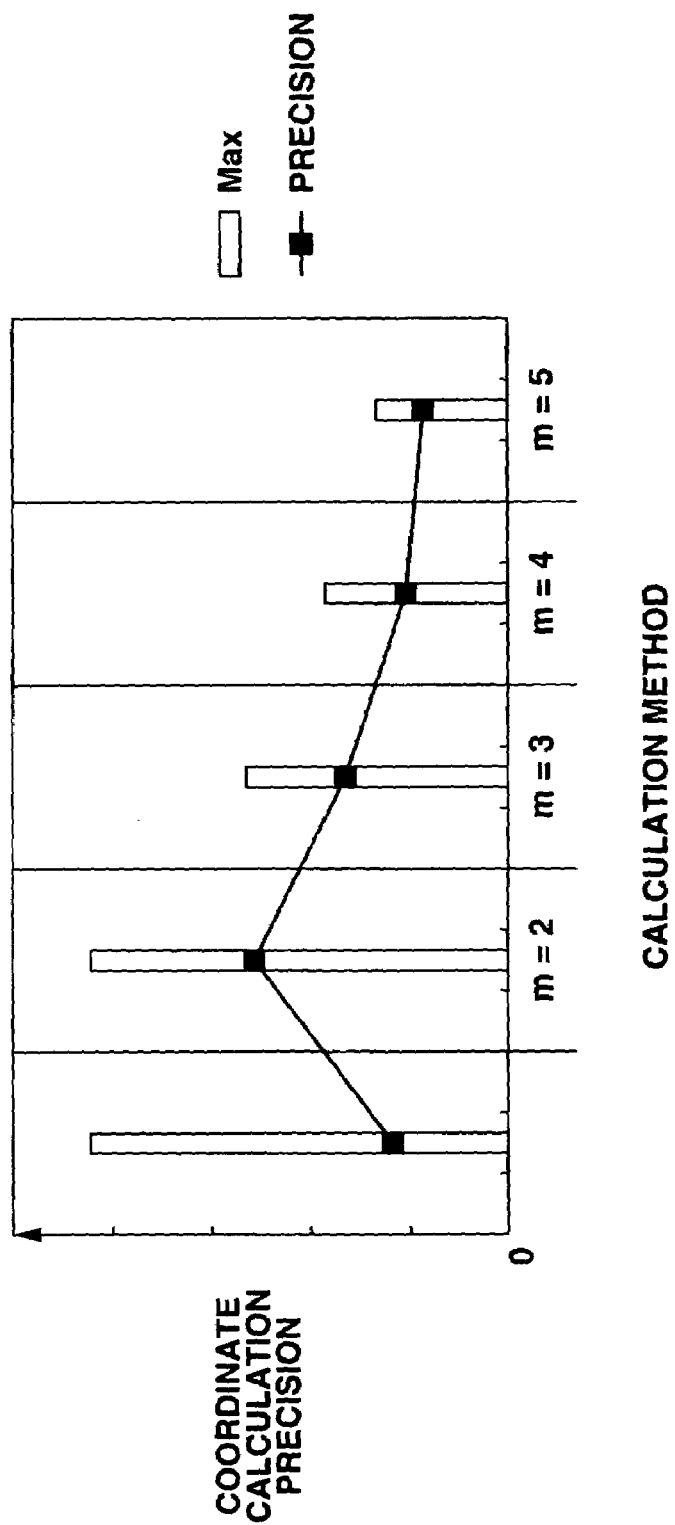

POSITION INFORMATION INPUT APPARATUS AND METHOD

BACKGROUND OF THE INVENTION

1. Field of the Invention

The present invention relates to a method and apparatus for inputting position information such as coordinate data, particularly for use with a large screen display system. In detail, the present invention relates to a position information input apparatus and method for generating position information such as a coordinate expressing a position designated on a display screen by an operator. The operator may use a designation device for designating the position. The input position information can be used for controlling an externally connected computer, or for writing characters and graphics.

2. Description of Related Art

Some of the prior coordinate input devices sense a light spot on the screen by using a CCD area sensor or linear sensor. The devices calculate and output coordinate values by performing an image processing using centroid coordinates, pattern matching, etc. Some of the prior coordinate input devices use position detection elements (an analogue device for obtaining an output voltage corresponding to a position of a light spot) called PSDs (Position Sensitive Detector).

For example, Japanese Patent Publication No. 7-76902 discloses an apparatus which senses a light spot of a parallel beam of visible light using a video camera, and calculates coordinate values. The apparatus simultaneously sends and receives a control signal by infrared diffusion light. Japanese Laid-Open Patent Application No. 6-274266 discloses an apparatus which detects a coordinate value by a linear CCD sensor and a special optical mask. On the other hand, Japanese Patent No. 2503182 discloses a structure of an apparatus using PSD and a correction method for outputting a coordinate value from the apparatus.

Nowadays, the brightness of large screen displays has improved, they can be used satisfactorily even in a brightly illuminated environment, and the display is expected to be in great demand. A coordinate input apparatus must be more tolerant to ambient light for use in such an environment together with the large screen display. The use of devices using an infrared light as a wireless communication unit is increasing recently. Since levels of infrared light and visible light are increasing in ambient light, it is an important feature for the apparatus to have a high tolerance to ambient light.

However, as is disclosed in Japanese Patent Publication No. 7-76902 and Japanese Laid-Open Patent Application No. 6-274266, ambient light is only controlled by an optical filter in the apparatus using a prior-art CCD sensor. To the contrary, as is disclosed in Japanese Patent No. 2503182, an effect of the ambient light is controlled by synchronized detection of frequency-modulated light intensity in the apparatus using a PSD. The apparatus with an optical filter achieves higher tolerance to ambient light.

The brightness and resolution of large screen displays are increasing. The resolving power in a coordinate input apparatus must also be increased, but this is difficult to achieve in an apparatus using a PSD having a high tolerance to ambient light. This is because a dynamic range of sensor output voltage corresponds to a range of input area exactly, then the apparatus must have at least 60 db or higher S/N ratio to achieve a resolving power or detection accuracy of 1 mm. As is disclosed in Japanese Patent No. 2503182, since a digital correction of linear error is necessary, a high precision analogue circuit, a multi bit AD converter and an arithmetic circuit are required. Since the S/N ratio of the sensor output signal depends on luminous energy and sharpness of the light spot, not only control of the ambient light but also a bright high precision optical system are required for producing a light spot. Accordingly, the apparatus increases in cost and size.

However, Japanese Patent Publication No. 7-76902 discloses a method using a plurality of video cameras simultaneously as a method for increasing a resolving power by using a CCD sensor. Such a method makes an apparatus increase in cost and size, and if a video camera having many pixels is used in the apparatus, it increases the apparatus' cost and size more than using a plurality of video cameras, and an artificially high resolving power realized in real time operation by performing an image processing also increases the apparatus' cost and size because high speed image processing is required.

Japanese Laid-Open Patent Application No. 6-274266 discloses a high resolving power realized by using a special optical mask and signal processing. The resolving power can be increased if the ambient light is weak and high S/N ratio is ensured. In practice, a linear sensor images a line, and the ambient light has more effect on a line image in this situation because the line image can't be separated from ambient light within a plane, in contrast to a situation in which an area sensor images dots. For this reason, the apparatus is able to be used only in a special environment having a low level of ambient light.

Generally, the optical elements like a CCD, etc. are mass produced by semi-conductor processes, but the various features such as optic-electric conversion efficiency, etc. differ widely depending on the product environment, the product condition, product lot, etc. For example, a difference of about plus and minus 30% in the optic-electric conversion efficiency is possible as a parts tolerance. When a CCD is worked at an electric source voltage of 5V, then if the nominal value of CCD output voltage in a dark condition is about 1.5V, the actual value for a particular device may be from about 1.0 to 2.0 V (about plus and minus 30%) due to the acceptable parts tolerance. Therefore, the threshold value must be set at 2.0V or more when determination of a light output is obtained by comparing the output with a fixed threshold voltage, but elements at the limits of the tolerance range will be unable to detect satisfactorily and the yield is thus decreased, in a structure which receives only low levels of light (namely CCD output is small). To adjust individually the threshold value set in each CCD described above can raise the light sensitivity, but assembly steps are increased and the cost goes up since an adjustment assembly is required.

The present invention aims to solve the above problems of the prior art, and one aspect of this invention is to control the effect of the ambient light and to provide a coordinate input apparatus and method having a high resolving power and a high precision.

Another aspect of this invention is to provide a small size and low cost coordinate input apparatus and method.

BRIEF DESCRIPTION OF THE DRAWINGS

Embodiments of the invention will now be described in detail with reference to the accompanying drawings, in which:

FIG. 3 is a truth table showing a relationship between the switch inputs and control outputs of the device of FIG. 2;

FIG. 15 is a diagram showing a coordinate calculation precision of each calculation method;

DETAILED DESCRIPTION OF PREFERRED EMBODIMENTS

Figure 1:
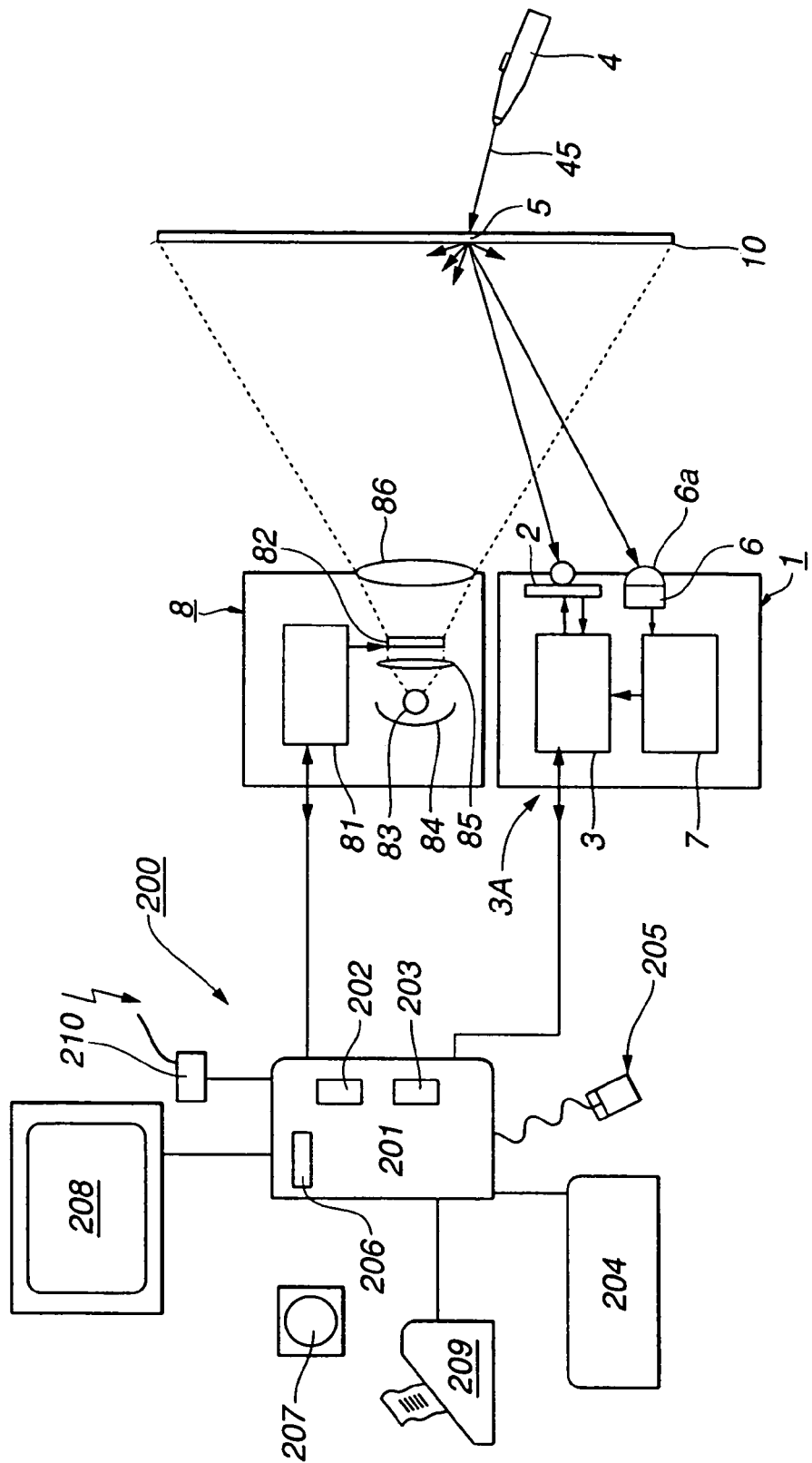
FIG. 1 is a schematic block diagram showing an arrangement of an optical coordinate input apparatus according to an embodiment of the present invention.

Referring now to the Figures, FIG. 1 is a schematic block diagram showing an arrangement of an optical coordinate input apparatus according to a first embodiment. As FIG. 1 shows, the apparatus comprises a designation device 4 for forming a light spot on a screen 10 as a coordinate input plane, and a coordinate detection device 1 for detecting position coordinates and optionally other parameters associated with a light spot 5 on the screen 10. In FIG. 1, a back-projection-type display apparatus 8 for displaying image or position information and the like is shown. The back-projection type display apparatus 8 functions as an output apparatus.

Figure 2:
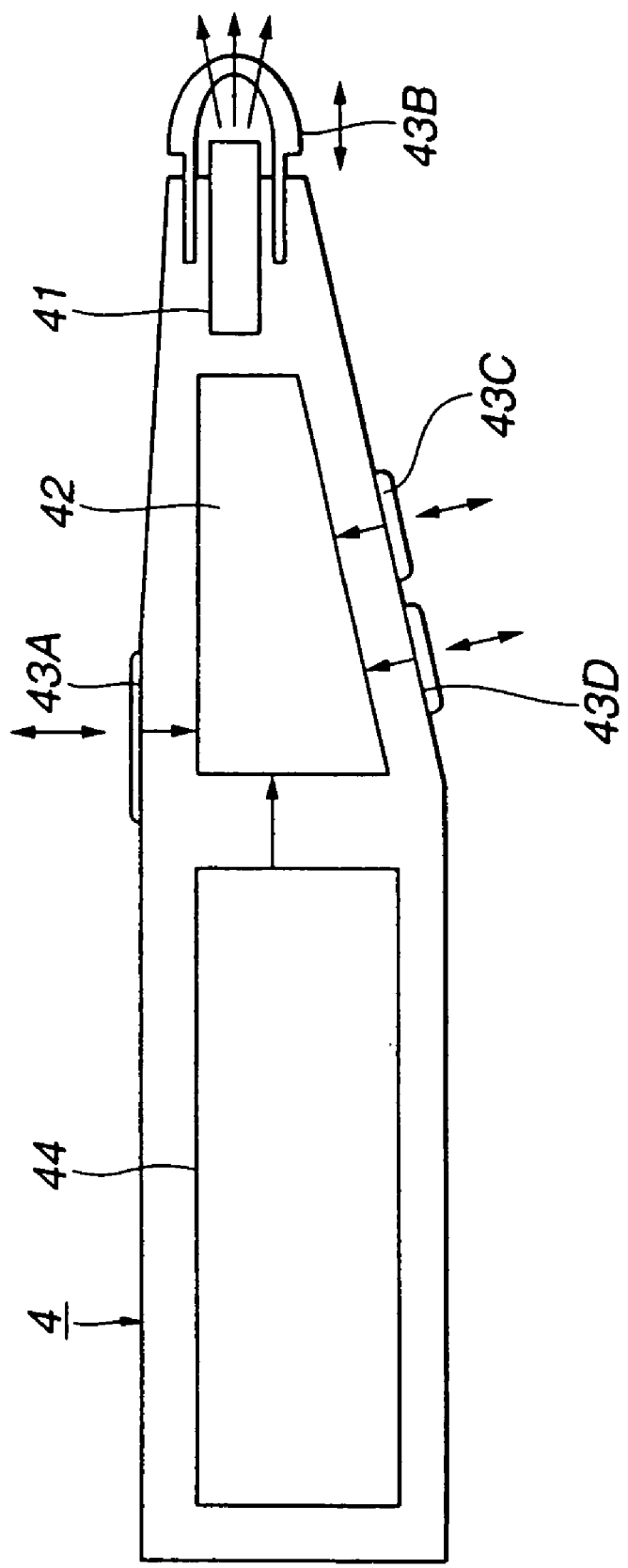
FIG. 2 is a block diagram showing an arrangement of a designation device.

FIG. 2 is a block diagram showing an arrangement of a designation device. The designation device 4 comprises a light emitting element 41 such as a light bulb, a semiconductor laser or an LED element for emitting a light beam 45, a light emission control unit 42 for controlling the emission of light, a plurality of operation switches 43A–43D, and a power source unit 44 which is an electric battery in this embodiment. Power source 44 may alternatively be a mains connection or a manually-operated generator.

Light emission control unit 42 controls the light emitting element 41 to turn ON and OFF at a predetermined cyclic frequency, and may also add a control signal to the emitted light by modulation methods to be described below. As an alternative to alternating the light emission between ON and OFF states, the alternation may be between two levels (HIGH and LOW) of brightness. The frequency of this alternating intensity is preferably high enough to avoid visible "flickering" of the light spot when viewed by the user. References to ON and OFF states should be construed accordingly to include references to HIGH and LOW. The control signal modulation applied to the alternating light beam depends on the conditions of the operation switches 43A to 43D. The frequency of the control signal modulation should be such as to avoid "flickering". Although the designation device is shown as having four switches 43A to 43D, other numbers and dispositions of switches are possible.

The coordinate detection device 1 in FIG. 1 detects light emitted from the designation device 4 after the light has passed through the screen 10. The device 1 comprises a coordinate detection sensor unit 2, a controller 3 controlling the coordinate detection sensor unit 2 and performing coordinate calculation, a control signal detection sensor (light receiving element) 6, and a signal processing unit 7.

The coordinate detection device 1 detects a coordinate of a position of a light spot 5 on the screen 10 and a control signal corresponding to a condition of each switch 43A to 43D of the designation device 4. The coordinate detection device 1 communicates the detected information to an external device such as a computer 200 via an output means 3A. The external device may be a personal computer comprising a processing unit 201 having RAM 202 and ROM 203 memories for storing data and programs, etc., input devices such as keyboard 204 and mouse 205, a disk drive 206 for reading and writing data to a removable disk 207, and a display 208. A printer 209 may optionally be connected to the computer 200, and a modem 210 may provide for communication via a network.

The computer 200 connected to the coordinate detection device 1 receives the detected information transmitted from output means 3A analyzes a coordinate and a control signal included in the received information and generates a command based on the analysis. The computer 200 may execute an operation depending on the command, or may transmit the command to an external device. The operation may be an instruction to the display 208, modem 210, printer 209 or memory drive 206. The instruction may be to display images or text on display 208, to send to or receive from other devices some information via modem 210, to print out images or text by printer 209 or to store some information to disc 207, which is detachable from the computer 200, by memory drive 206. The memory 207 may be a floppy disc memory, a compact disc memory or an optical memory etc.

Computer 200 may identify an icon designated by the coordinate and then generate a command corresponding to the type of icon and the control signal transmitted by the light beam. The icon is identified based on a relation between coordinates and command icons stored in a memory within the computer 200.

Figure 4:
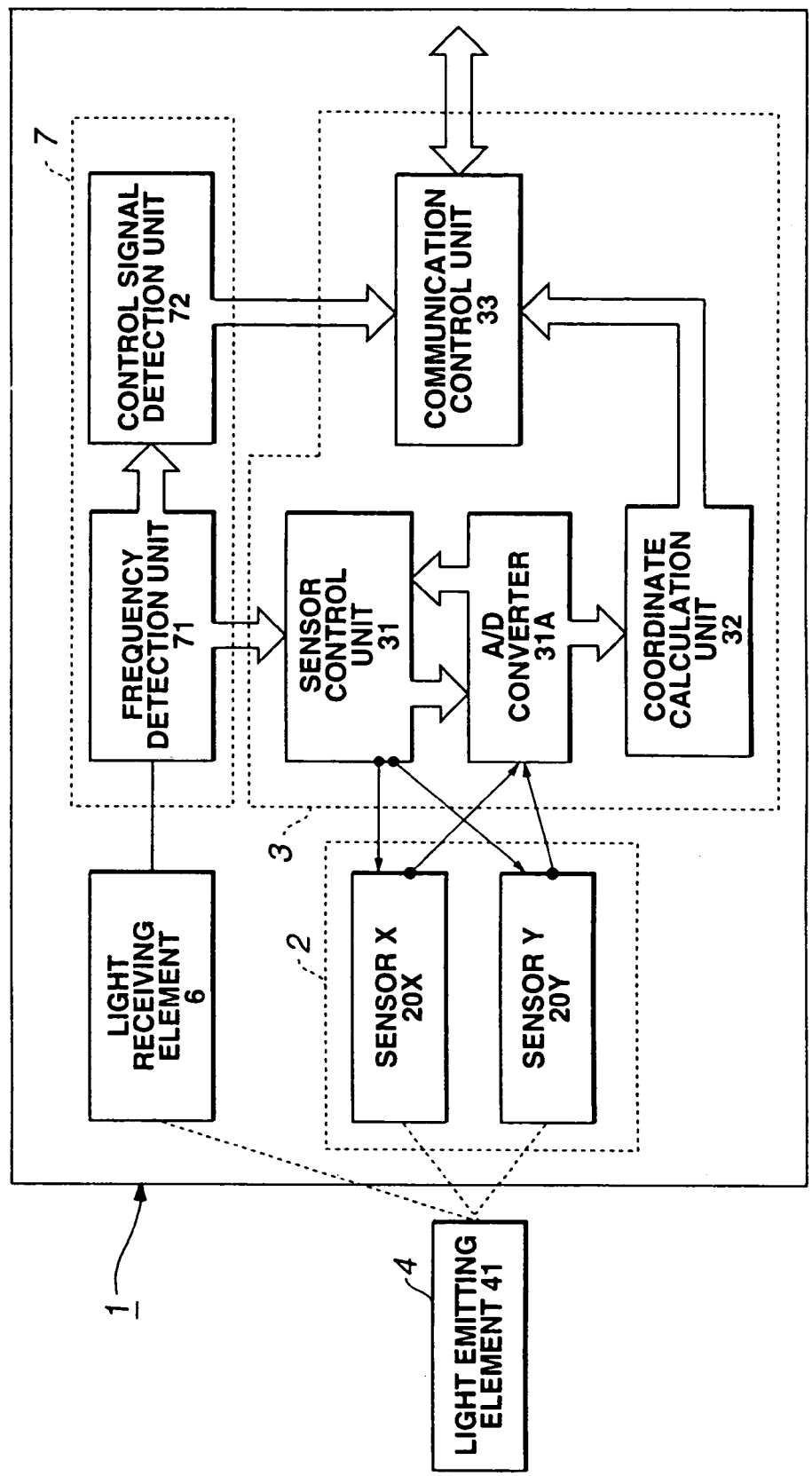
FIG. 4 is a block diagram showing a schematic arrangement of the coordinate detection device of FIG. 1.

In the above, computer 200 receives a coordinate transmitted from output means 3A, but, as shown in FIG. 4, when coordinate calculation unit 32 is arranged in computer 200, computer 200 receives the output of AD conversion 31A and is arranged to set the threshold value, select effective difference data and calculate the coordinates.

The back-projection type display apparatus 8 comprises an illumination optical system and a projection lens 86. The illumination optical system includes an image signal processing unit 81, which is adapted to receive an image signal output from the external device 200 and to provide a control signal to drive a liquid crystal panel 82. The display apparatus further comprises a lamp 83, a mirror 84 and a condenser lens 85. The back-projection type display apparatus 8 is capable of displaying a desired image on the screen 10. The screen 10 has a suitable light diffusion for increasing a visible range of a projection image. A light beam emitted by the designation device 4 is also transmitted and diffused at a light spot 5. The coordinate detection device 1 receives a part of the diffused light independent of the position of the light spot on the screen and of the direction of the incident light beam 45 from the designation device 4 relative to the plane of the screen 10.

The coordinate input apparatus according to this embodiment is capable of inputting character information and line and image information on the screen 10 by moving the light spot 5 over the screen, and by modulating the light beam emitted by the designation device 4 using the switches 43A to 43D. The coordinate information and modulation information associated with the light spot 5 is transmitted to the computer 200 via the output means 3A. This information is processed and may influence the image signal sent from the computer 200 to the image signal processing unit 81, to display the information by using the projection type display apparatus 8. The designation device 4 may thus be used as an information input/output device to move a cursor displayed on the screen 10, to designate a button displayed on the screen 10 or to perform an input operation by selecting an icon. An optical coordinate input apparatus according to this embodiment is described in detail below.

The light emission control unit 42 (FIG. 2) controls a light emitting element 41 to turn the light ON and OFF (or to alternate the light emission between HIGH and LOW intensity states), and to add a control signal to the light by modulation methods described below. The nature of the control signal depends on a condition of the operation switches 43A to 43D. A truth table showing the relationship between the switch inputs of the designation device 4 and the control signals is shown in FIG. 3.

In FIG. 3, Switch A–D corresponds to switches 43A–43D in FIG. 2, "light emission" corresponds to emission of an alternating light beam from element 41, producing a light spot 5, while "pen down" and "pen button" correspond to control signals transmitted by modulating the alternating light beam.

An operator grasps the designation device 4 and points it at the screen 10. The switch 43A is arranged at a position convenient for the operator's thumb. When the switch 43A is pushed, the light beam 45 is emitted. The light spot 5 is generated on the screen 10 and a coordinate signal output is started. In this situation, the control signals for pen down and pen button are in the OFF condition. Therefore only a coordinate position on the screen is indicated at output 3A.

The switches 43C and 43D, are arranged at positions convenient for the operator's index finger and middle finger, respectively. When these switches are pushed, then control signals corresponding to pen down and pen button are added to the light beam 45 as shown in FIG. 3. Namely, when the switch 43C is pushed, the "pen down" control signal is sent via the light beam 45. Then the display controlling functions, such as to input characters, lines and images, or to select and operate buttons displayed as icons on the screen, become available.

When the switch 43D is pushed the "pen button" control signal is sent via the light beam 45. Another function such as calling a menu may then become available. Therefore the operator can quickly and accurately draw characters and images at the desired position on the screen 10 and can select and operate buttons and menus so that an efficient operation becomes possible.

If the designation device 4 is to be used only as a direct input device, i.e. it's not to be used as a pointer but only to be used in contact with the screen, it is not necessary to produce a light beam, and a diffusion light is available as the light source for the designating device. It is then possible to use a lower cost and longer life LED rather than a semiconductor laser.

The system shown in FIG. 1 is a back projection system, namely the structure of the display apparatus 8 is positioned behind the screen 10 (on the opposite side of the screen from the operator). The image output from the display apparatus 8 is projected onto the screen from behind. The light emitted by the designation device 4 reaches the coordinate detection device 1 after passing through the screen 10. On the other hand, front type projectors such as that shown in FIG. 23, which project an image output from a display apparatus onto a wall of a room or onto an opaque screen, have become common, and this invention can be used with such a system.

The structure of the coordinate detection device 1 is similar to that used with the back-projection type system explained above, and consequently its detailed description is omitted here. The position of the light has to be detected without the light passing through the screen 10 in the embodiment of the front projection type system. The structure of the designation device 140 for use with a front projection display system 108 is described with reference to FIGS. 23 and 24 below.

The designation device 140 comprises an elongated telescopic center section C, at one end of which is a grip part 140a. The grip part houses operating switches 143A, 143C and 143D, as well as internal operating components, namely a power source 144 and a light emission control unit 142. A light emitting source 141 is arranged in a tip portion 146 situated at the other end of the center section C. The tip portion 146 comprises a light emitting element 141, a switch 143B, and a transparent protective cover 147. The light emitting element 141 and the cover 147 are so configured that when the switch 143B is placed in contact with the screen 110, light emitted from the light emitting source 141 is directed away from the screen 110. In this system therefore a part of the emitted light 145 can reach the coordinate detection device 100 without passing through the screen 110. The switch 143B is operated by being pressed onto the screen 110, and this causes the light emitting source 141 to start the light emission. Part of the light emitted from the light emitting source 141 reaches the coordinate detection device 100 through the protective cover 147, and the light can reach the coordinate detection device 100 even if the designation device's orientation is changed, since the protective cover 147 has a light diffusion feature and a lens effect causing the light 145 to be emitted as a broad beam directed substantially perpendicularly to the length direction of the designation device 140. Each operational component of the designation device 140 shown in FIG. 24 performs the same function as its correspondingly numbered counterpart in the designation device of FIG. 2.

For example, when a projection type display apparatus without the coordinate detection apparatus and the designation device is used in a meeting, the speaker should not stand between the projection type display apparatus and the screen in order to avoid blocking the light from the projection type display apparatus. A tool such as a pointer is used to draw attention to an area of the screen. Moreover, for a smooth running presentation, the speaker moves to the computer controlling the displayed image to input a control to change the image, or another person is required for inputting control data to the computer when the displayed image on the screen has to be changed.

Figure 23:
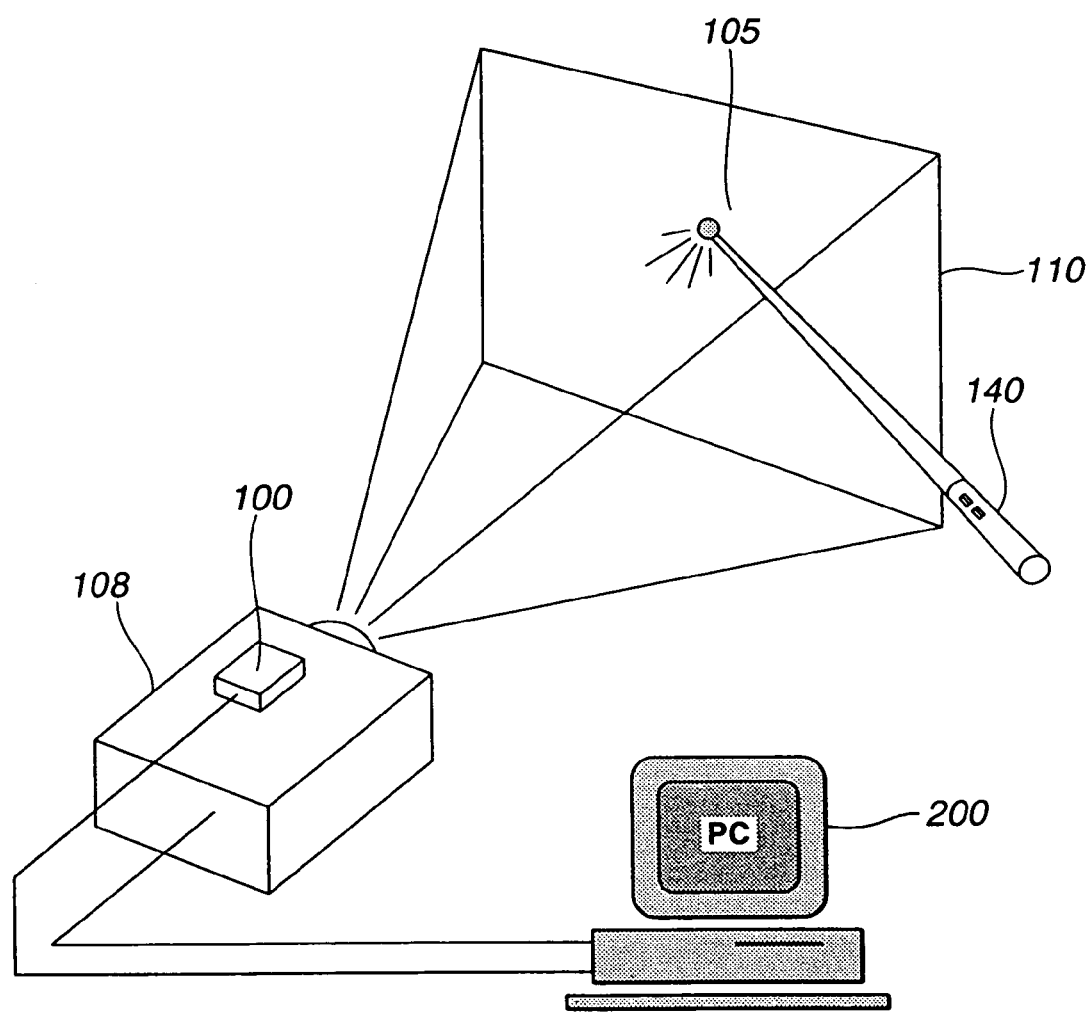
FIG. 23 is a schematic diagram showing an arrangement for a front-projection display system.
Figure 24:
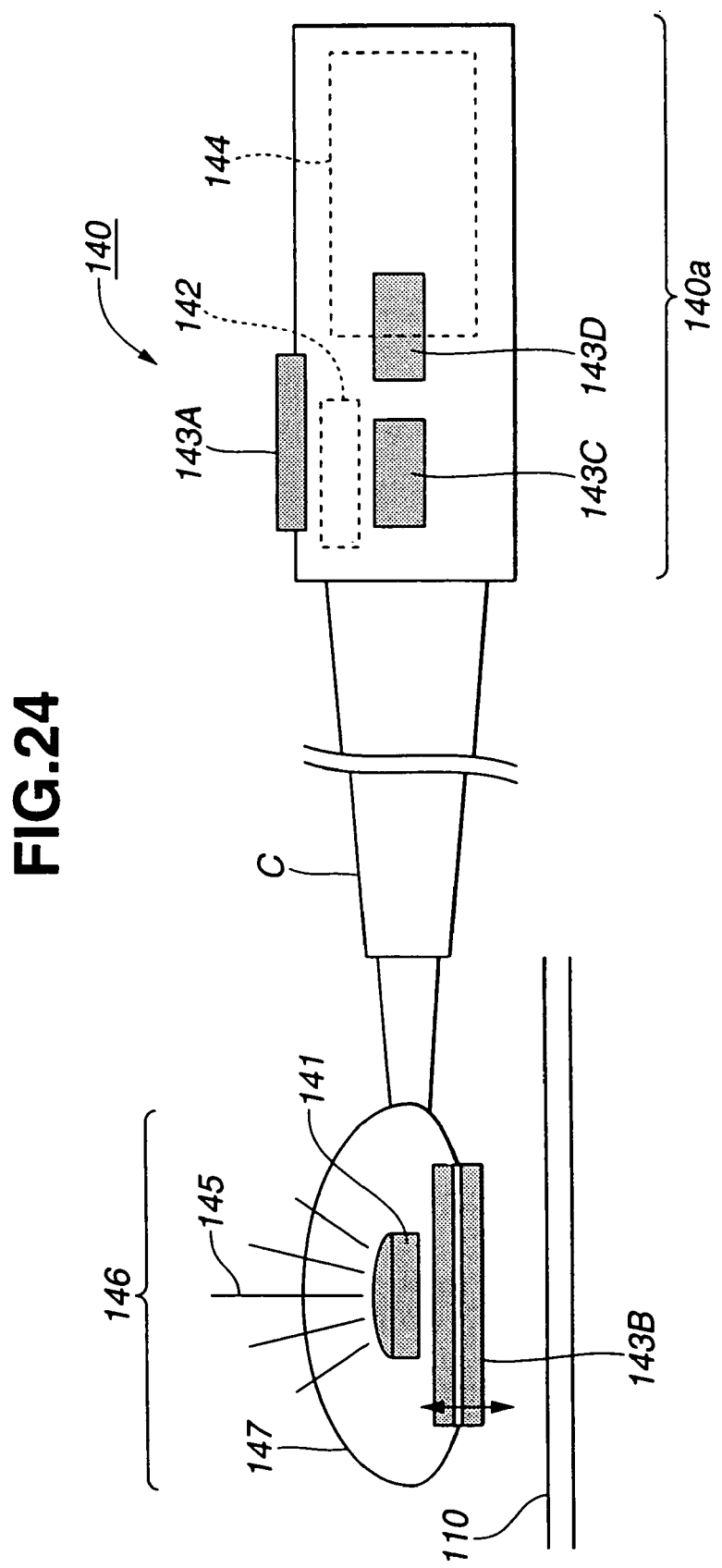
FIG. 24 is a diagram showing a designation device for use in the front-projection display system of FIG. 23.

However the system shown in FIGS. 23 and 24 enables the speaker to add information to the displayed image and input position information of a desired position without approaching the computer. Additionally, the input can work in the same way as a conventional screen mouse, and by clicking on an icon such as a command input button, the user can control the computer without moving and without another person's help.

The switch 43B of the designating device of FIG. 2 is arranged at the distal end of the designation device 4. Similarly the switch 143B of the designating device of FIG. 24 is arranged at the distal end of the designation device 140 (i.e., the end remote from the grip 140a). The switches 43B and 143B are both operated by being pressed on the screen 10 or 110. The operator grasps the designation device 4 or 140, presses the end or tip of the designation device on to the screen 10 or 110 and the "pen down" control signal is applied to the light beam emitted from the designating device 4 or 140. The coordinate detection sensor units 2 detect the position of the light spot 5 or 105, and the control signal detection sensor 6 detects the control signal applied to the light beam. As can be seen from the table in FIG. 3, when the light emission is ON and the designating device is pressed on to the screen, both a position signal and a control signal are transmitted via the light beam. Then an extra switch operation is unnecessary for spontaneous input pen operations.

The switch 43A or 143A plays a part of a pen button. Pushing the switch 43A without pressing the designating device onto the screen can provide only a position signal, which may be used in the external device to control the position of a screen cursor. In reality, to input characters and images by touching directly on the screen is much better in operation and more accurate than to operate far from the screen. This embodiment can realize a spontaneous and comfortable operation in a position close to the screen or a position far from the screen by using four switches as described above, and the switches are used according to the situation.

The light emission controller 42 or 142 may be configured to transmit an individual identifying signal such as an ID number as part of the modulation of the light beam 45 or 145, so that two types of designation devices 4 and/or 140, such as a contact designation type and a remote designation type can be used, or so that two or more operators can use designation devices at the same time, or a plurality of designation devices 4 or 140 having different attributes in color or line width can be used. Software of an externally connected device may be arranged so that attributes of drawing lines in color or width are made to correspond with lines drawn by a particular device 4 or 140 in accordance with the ID number of that device. The line attributes for each device may be set and changed by using a button or menu on the screen. Alternatively, the software may be arranged to transmit a change control signal by using an extra operation button arranged on the designation device 4 or 140 for that operation. A further alternative arrangement is to store in the designation device 4 or the coordinate detection device 1 data corresponding to line attributes, etc., of each designating device and to transmit this data, rather than the designating device's ID number, to the external device.

The extra operation button such as described above can be used for another function. For example to flash on and off on a display apparatus, to switch a signal source, to control a video recorder or other device connected either to the external device (the computer 200) or connected directly to the coordinate detection device 1 via an auxiliary output port separate from port 3A. Further, if a pressure detection means is provided for either or both of the switches 43A and 43B (or 143A and 143B), this allows the detection of a writing pressure and the transmission of the writing pressure with the control signal. In this way, various useful signals can be transmitted to the coordinate detection device 1.

Figure 7:
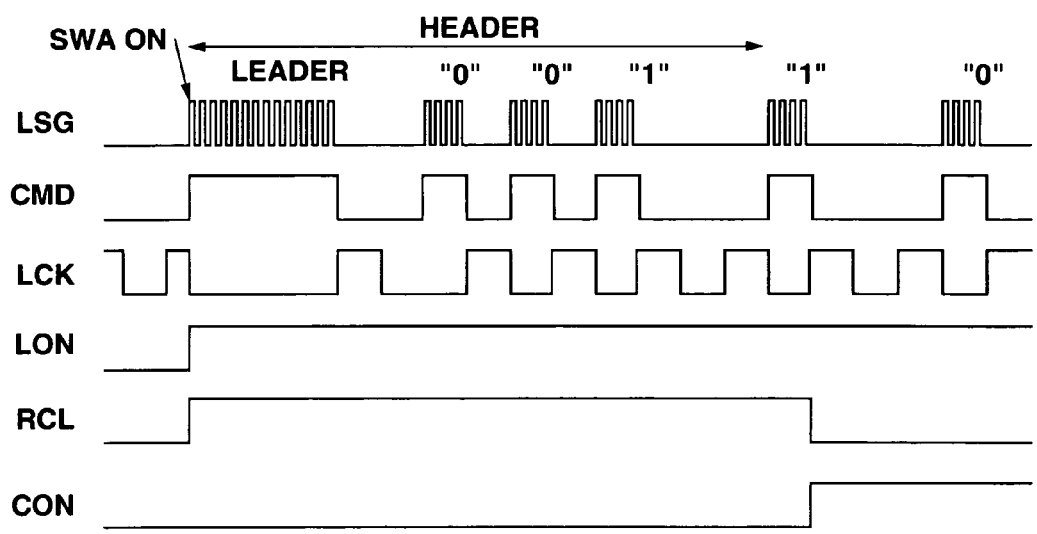
FIG. 7 is a timing chart of a control signal decoding operation.

The light emitting starts in accordance with changing to the ON condition of either the switch 43A or switch 43B of the designation device 4, and a light emission signal such as the LSG signal shown in FIG. 7 is output. Namely, in the light emission signal of this embodiment, a header part comprising a comparatively long leader part (LEADER) having a continuous pulse sequence and codes such as a manufacturer ID is output at first. After that, the transmission data sequences comprising a pen ID and control signal, etc., is output in a predetermined order and format.

In this embodiment, a "1" bit signal is defined by a clock interval in which light is received followed by three clock intervals in which no light is received. A "0" bit signal is defined as a clock interval during which the light is received followed by a single clock interval of no light. In this modulation format, the "1" bit requires twice the interval of the "0" bit for transmission (four clock intervals as opposed to two). Various data modulation formats are usable. As will be explained below, it is necessary to keep a constant light value average for effective coordinate detection, and for the clock intervals of the control signal modulation to be large enough for PLL tuning. In a consideration that a comparatively high redundancy doesn't create significant difficulty in a data amount to be transmitted, 6 bit (64) data are modulated to 108 codes within 10 bits length codes in which equal numbers of "1" and "0" bits are present, and the number of consecutive "1"s or "0"s is three or less in this embodiment. According to this modulation method, a stable sync signal can be generated easily since an average of voltage is kept constant and the large clock intervals are included.

The control signals indicative of a "pen down" and "pen button" require 2 bits as described above, but other long data such as an ID code has to be transmitted. In this embodiment, one block of 24 bits comprising a control signal for the first 2 bits, a contents identification code for the next 2 bits (for example "00" means a writing pressure, "11" means an ID and so on), then a parity signal for the next 2 bits, data for the next 16 bits and a further parity signal for the next 2 bits. When data is modulated like this by using the above described method, a signal 40 bits in length is generated. A sync code having 10 bits in length is added to that. The sync code has a pattern with four consecutive 0 codes and five consecutive 1 codes. The pattern is changed to an opposite pattern in accordance with whether the end of the last block is 1 or 0. By using that special code, the identification of a data word is performed easily, and the position is identified accurately even in the middle of the data sequence. Then decoding can be performed. Therefore the transmission signal has 50 bits length for one block and can transmit a control signal, ID, data and writing pressure, etc.

In this embodiment, however, the frequency at which the intensity of the light varies (the "first frequency") is set to 60 kHz, and the frequency of the clock intervals in the control signal modulation (the "second frequency") is set to 7.5 kHz which is ⅛ of the first frequency. Since the modulation is performed by the above method, an average of the transmission bit rate is 5 kHz which is ⅔ of the second frequency. One block has 50 bits. The 24 bits of data are transmitted as one block at 100 Hz. Therefore an effective bit rate exclusive parity is 2000 bits/sec. The redundancy is high with this method, but communication can be effected in a simple structure that can avoid incorrect detection and synchronize very easily.

By using both a phase synchronized signal for a sensor control described below and checking the sync code repeat cycle, the signal can be followed even if a short drop out occurs in the signal. The presence or absence of a header signal is used to distinguish between a drop out and the quick operations of "pen up" and "double click".

The Coordinate Detection Device 1

FIG. 4 shows an internal arrangement of the coordinate detection device 1. The coordinate detection device 1 has a sensitive light receiving element 6 for detecting a luminous energy by using a condensing optical system, and two linear sensors 20X and 20Y for detecting a direction of a light source by using an imaging optical system. The linear sensors constitute a coordinate detection sensor unit 2.

The operation of the coordinate detector is the same, irrespective of whether the back-projection or front projection display device is used. The following description will refer to the back-projection embodiment, but it is to be understood that the detection of the position of the light spot is carried out in the same manner in the front projection arrangement.

The coordinate detection device 1 receives light diffused from the light spot 5 generated on the screen 10 by a light beam from the light emitting element 41 within the designation device 4. A controller 3 constitutes a sensor control unit 3, an AD conversion unit 31A, a coordinate calculation unit 32 and a communication unit 33. Controller 7 (Signal processing unit) constitutes a frequency detection unit 71 and a control signal detection unit 72. The function of each unit will be clear from the description below.

(Description of Imaging Optical System Operation)

An imaging lens 6a is attached to the light receiving element 6 as an imaging optical system (FIG. 1), and detects with high sensitivity a luminous energy of a predetermined wavelength over the entire area of the screen 10. After the detection output is detected by the frequency detection unit 71, a digital signal, which includes data such as a control signal (the signal is added by the light emission control unit 42 of the designation device 4), is decoded in the control signal detection unit 72.

Figure 25:
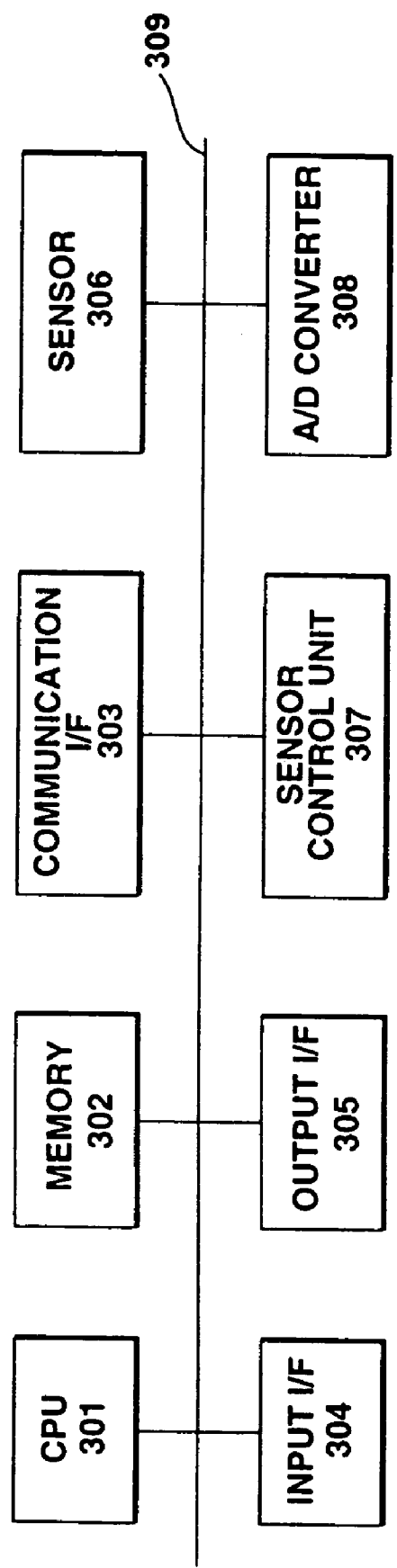
FIG. 25 is a block diagram illustrating the operational components of the coordinate input apparatus.

The operational components of the coordinate detection device 1 are illustrated in FIG. 25. The apparatus comprises a Central Processing Unit (CPU) 301 for controlling and executing the processing operations, and memory 302 for storing the control programs and various data generated in each operation. The control program for executing the operations shown in the flowcharts of FIGS. 12, 16, 17 and 20 are stored in the memory 302 and the CPU 301 executes the operations based on the control programs. Therefore, the operations of the coordinate calculation unit 32, frequency detection unit 71 and control signal detection unit 72 seen in FIG. 4 are executed by the CPU 301. The programs are preferably stored in the memory 302 before the operation starts, by reading them from a data carrier such as a floppy disk or CDROM or by downloading from an external source via a modem 210 connected to a communications network (see FIG. 1).

When the memory 302 is connected for communication with the CPU 301, the operation based on the control program stored in the memory 302 can be executed. Communication interface 303 controls the communication between the apparatus and an external device such as computer 200, an information processing unit, movable device, or telephone, etc. (not shown). The communication interface 303 controls transmitting and receiving of signals and data. The signals and data may be received and transmitted through a network such as a public communication service, Internet, or LAN (Local Area Network) between the apparatus and external devices. Input interface 304 controls signals and data input, and output interface 305 controls signals and data output. Sensor 306, sensor control unit 307 and AD converter 308 correspond to the units 2, 31 and 31A in FIG. 4.

In FIG. 25, the apparatus comprises a sensor 306, sensor control unit 307 and AD converter 308, but the sensor 306 can be arranged in a separate device from the remaining components. In that case, the input interface 304 receives signals transmitted from the sensor 306 and sends them to the sensor control unit 307 or AD converter 308, and the output interface 305 transmits a control signal and data from the sensor control unit 307 to the external sensor 306. Further, not only the sensor 306 but also the sensor control unit 307 or AD converter 308 can be arranged in another external device. In that case, the input interface 304 receives signals and data transmitted from the sensor control unit 307 or AD converter 308 and sends them to other internal units, and the output interface 305 transmits signals and data from other internal units to the sensor control unit 307 or the AD converter 308. The operations of the input interface 304 and output interface 305 for communicating between the apparatus and the external devices are controlled by the CPU 301. Each unit of the apparatus of FIG. 25 is connected with bus 309, and signals and data can be transmitted between any two units.

The apparatus shown in FIG. 25 may include a display device for displaying an image or message showing a condition of operation or input signal and data, and an input device such as a key board or a pointing device for inputting an instruction for controlling the operations.

FIG. 7 is a timing chart describing a decoding operation of a control signal. The signal constituted by the bit sequence described above is detected as a light output signal LSG in the light receiving element 6 and detected in the frequency detection unit 71. The frequency detection unit 71 is structured to tune with a pulse cycle of the first frequency in the light output signal LSG, and it decodes a modulation signal CMD without influence of the ambient light by using it with an optical filter. This detection method is the same as the manner of an infrared remote controller used in broad practice, and is a highly reliable wireless communication method. In this description, the first frequency is 60 kHz, which is a higher frequency than is usually used with infrared remote controllers, so that an incorrect operation should not occur if a conventional infrared remote controller is used simultaneously. The first frequency can, however, be in a frequency range of the usual infrared remote controller. In this case, incorrect operation can be avoided by an identification of an ID signal.

The modulation signal CMD detected by the frequency detection unit 71 is analyzed as digital data by the control signal detection unit 72, and the control signals such as "pen down" and "pen button" described above are decoded. The decoded control signals are sent to the communication control unit 33. The code modulation cycle included in the modulation signal CMD is detected as the second frequency by the sensor control unit 31 and the linear sensor 20X and 20Y. Namely, each unit is reset on the timing of the header part shown in FIG. 7, after that a signal LCK phase synchronized with a falling edge of the modulation signal CMD is generated. Therefore, the generated signal LCK has a constant cycle and is synchronized with a light luminance of the designation device 4. A signal LON is generated to be high when the light spot is present, and low when the designation device projects no light, and a sensor reset signal RCL is triggered by the signal LON and is generated from the modulation signal CMD. The linear sensors 20X and 20Y are reset while the modulation signal CMD is on a high level, and synchronized integration operation is started at the falling edge of the sensor reset signal RCL synchronized with the rising edge of the signal LON.

The control signal detection unit 72 detects the header part of the signal and then confirms a start of input from the designation device 4, and not from another device or noise. The signal is identified, then the identification signal is transmitted from the communication control unit 33 to the sensor control unit 31, a signal CON showing that linear sensors 20X and 20Y operations are effective is set on high level, and an operation in the coordinate calculation unit 32 is started.

Figure 8:
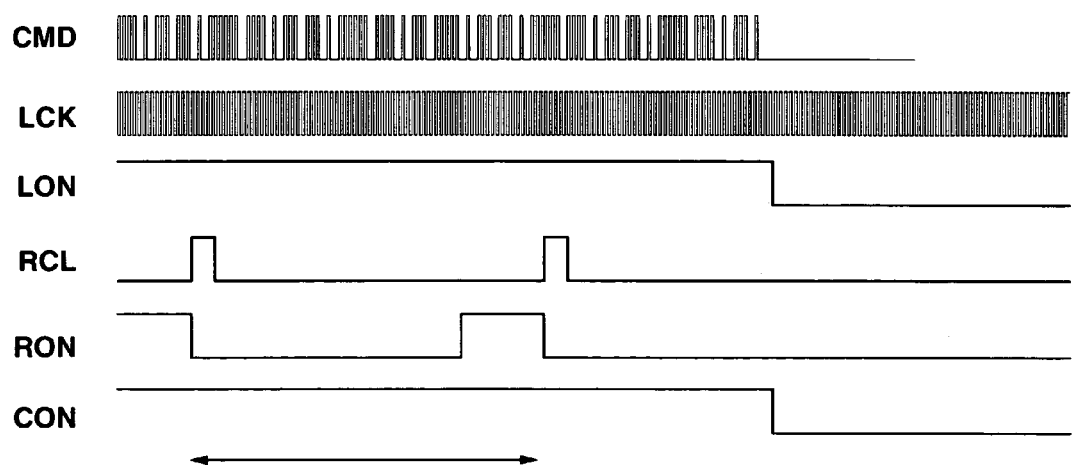
FIG. 8 is a timing chart at the end of a series of operations for decoding a control signal from an output signal of a light reception element.

FIG. 8 shows a timing chart at the end of a series of operations after the light output signal has stopped. If the modulation signal CMD detected from the light output signal LSG stays at a low level for a predetermined period or more, the signal LON which shows the presence or absence of the light spot changes to low level, and the signal CON which shows sensor operation is effective also changes to low level. The result is that the coordinate output operation of linear sensors 20X and 20Y ends.

(Description of Imaging Optical System Operation)

Figure 5:
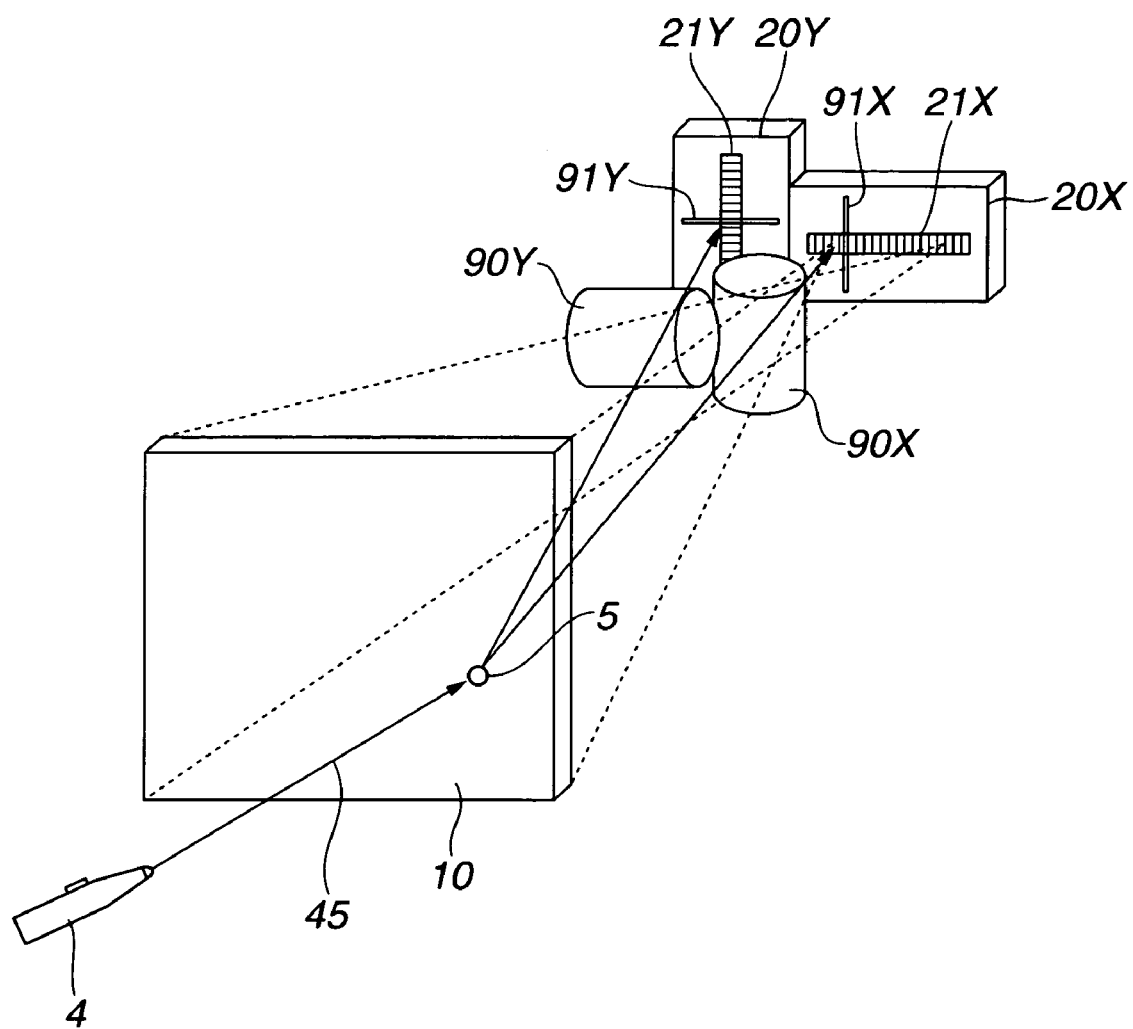
FIG. 5 is a schematic diagram showing a physical arrangement of linear sensors 20X and 20Y.

FIG. 5 is a diagram showing an arrangement of the linear sensors 20X and 20Y. The images (91X, 91Y) of the light spot 5 are created as lines each falling transversely across a respective linear array of sensors. Each sensor corresponds to a pixel of the array. The linear images of the light spot are formed on the sensitive parts (21X, 21Y) of each sensor array by respective cylindrical lenses 90X and 90Y as an imaging optical system. By arranging that the axes of the cylindrical lenses make a right angle exactly, each output has a peak at a pixel corresponding to an X coordinate or a Y coordinate. These two sensors are controlled by the sensor control unit 31. The output signal is converted to a digital signal by the A/D conversion unit 31A connected with the sensor control unit 31, and is sent to the coordinate calculation unit 32.

The coordinate calculation unit 32 calculates an output coordinate value from the digital signal and supplies the result to the control signal detection unit 72. The control signal detection unit 72 sends the coordinate value from the coordinate calculation unit 32 to an outside control apparatus (for example computer 200) by a predetermined communication method through the communication control unit 33 with data such as a control signal.

A mode switch signal is sent from the communication control unit 33 to the sensor control unit 31 and the coordinate calculation unit 32 for an unusual operation such as adjustment (for example a setting of user correction value).

In this embodiment, focus is adjusted so that the linear image of the light spot 5 has a width which is a number of times greater than the width of a pixel in each sensor, and the image is shaded off intentionally. In an experiment using plastic cylindrical lenses with sensor arrays having 1.5 $\mu$m pixel pitch and 64 effective pixels and infrared LED, if the sharpest image is created, the image has 15 $\mu$m or less width within all available degrees, and it is clear that a separated calculation result between pixels makes distortion in this situation. And if a position of the lens is adjusted so that an image has 30 $\mu$m to 60 $\mu$m more or less in width, very smooth coordinate data can be obtained. Of course a peak level is too small if a vignette is too large, but a vignette will be best in some pixel width. One of this embodiment's points is to use a CCD having a small number of pixels, and an optical system which gives a linear image covering a suitable number of pixels. A coordinate input apparatus which needs a small calculation capability, a small sensor and a small optical system, and provides reliable detection, high precision and high speed is realized by using that combination.

Figure 6:
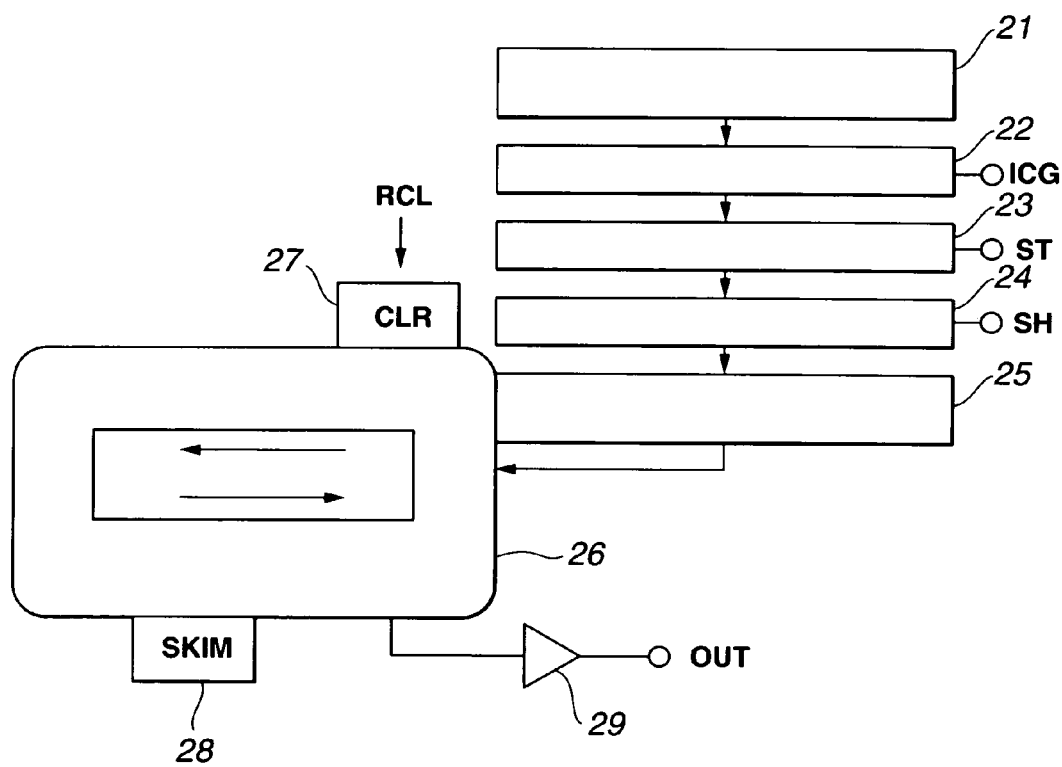
FIG. 6 is a block diagram showing an internal arrangement of a linear sensor for X or Y coordinate detection.

A linear sensor 20X for X coordinate detection and a linear sensor 20Y for Y coordinate detection are arranged in an array and have the same structure. Only linear sensor 20X for X coordinate detection is described below. FIG. 6 is a block diagram showing the internal arrangement of the linear sensor.

The sensor array 21 as the light receiving part is constituted by N pixels (64 pixels in this embodiment) and electric charges corresponding to the amount of light received at each pixel are stored in the integrating unit 22. The integrating unit 22 has N parts and can be reset by addition of a voltage at gate ICG, allowing an electric shutter operation to be effected. The electric charge stored in the integrating unit 22 is transmitted to a storage unit 23 responding to an addition of a pulse voltage at an electrode ST. The storage unit 23 has 2×N parts and stores electric charge separately corresponding to H(high level) and L(low level) of the signal LCK synchronized with a light emitting timing of the designation device 4. As a result, for each pixel an electric charge corresponding to the light emission state and a charge corresponding to the light non-emission state is stored. After that, the separately stored electric charges synchronized with the light flashing on and off (or alternating between HIGH and LOW intensity) are transmitted to the linear CCD unit 25 having 2×N parts through the shift unit 24, which is arranged to make a simple transmission clock having 2×N parts.

Therefore, electric charges corresponding to sensor outputs in a light emission state and light non-emission state are stored for all 64 pixels contiguously in the linear CCD unit 25. The electrical charges arranged in the linear sensor unit 25 are transmitted sequentially to the ring CCD 26 having 2×N parts. The ring CCD 26 is cleared at CLR 27 responding to the single RCR and from the linear CCD 25.

The stored electric charges are read out by an amplifier 29. The amplifier 29 outputs a voltage being in proportion to the stored electric charge amount. In practice, it outputs a difference of electrical charge amount between adjacent stored values, i.e., an amplified amount corresponding to the difference between the electric charge amount of a pixel in the light emission state of the light emitting element 41 and the electric charge amount of that pixel in the light non-emission state, for each of the N pixels.

Figure 9:
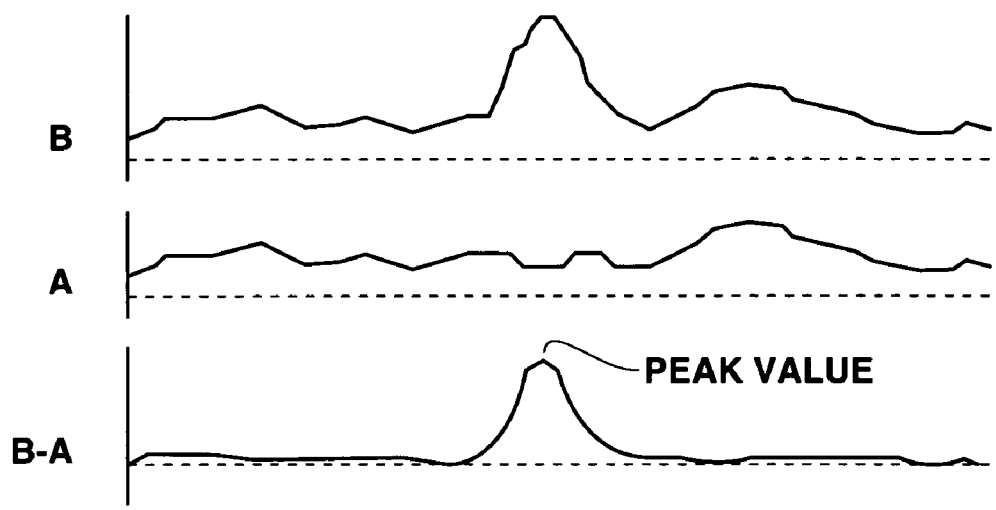
FIG. 9 is a waveform diagram showing an example of a waveform output from a linear sensor for X or Y coordinate detection.

FIG. 9 is a diagram showing an example of a waveform output from linear sensors 20X and 20Y. In the figure, the vertical axis relates to charge amount, and the horizontal axis to pixel position. Waveform B shows a signal read out in the light emission state of the light emitting element 41, and waveform A shows a waveform in a light non-emission state, i.e. it shows only the ambient light waveform. (As described in relation to FIG. 6, the electric charges corresponding to these waveforms A and B are stored contiguously in the ring CCD 26.) However since amplifier 29 outputs an amplified difference between the adjacent electric charge amounts (waveform B-A), a signal representing only light from the designation device 4 can be obtained, and a stable coordinate input without any influence of the ambient light is available.

A maximum value of B-A waveform shown in FIG. 9 is also defined as the PEAK value. If a storage period for the sensor function against light is increased, i.e., if charge is allowed to build up by adding together charge values for successive clock intervals, the PEAK value is increased correspondingly to the period increase. In other words, if a cycle period of the signal LCK is used as a unit storage period, the number of storage times n is defined by using the unit storage period, and if the number of storage times n is increased, then the PEAK value is increased. By increasing the detection time until the PEAK value reaches a predetermined value TH1, an output waveform having stable quality at all times can be obtained.

Figure 10:
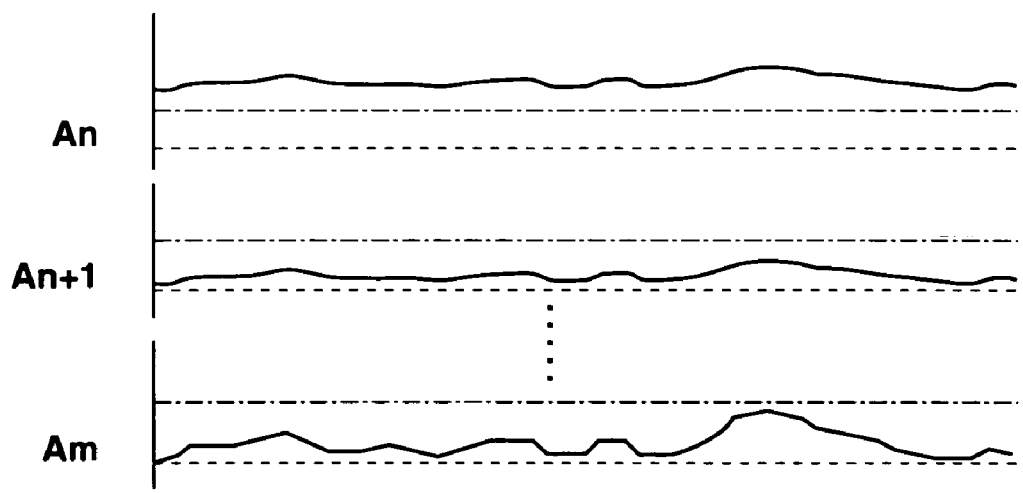
FIG. 10 is a waveform diagram showing a skim operation in a linear sensor.

If the ambient light is very strong, a transmission electric charge of the ring CCD 26 threatens to be saturated before a peak of the difference of wave B-A becomes sufficiently increased. To combat this effect, the sensor is provided with a skim unit 28 having a skim function. The skim unit 28 senses the signal level in the light non-emitting state (i.e. the ambient light), and if the signal level exceeds a predetermined value (the level is shown by a dot and a chain line in FIG. 10) at an n-th clock interval An as shown in FIG. 10, a predetermined value of electrical charge is removed from the stored electrical charge in each pixel. Therefore, the waveform An+1 is obtained at the next (n+1th) clock interval. By repeatedly subtracting charge until the signal is below the threshold, even if the ambient light is strong, saturation won't occur. Therefore, even if the luminous energy of the light flashing on and off is weak, a big enough signal waveform can be obtained by repeating the integral operation a number of times. Especially in the case where a visible ray range light source is used in the designation device 4, a signal of a displayed image is added, then a sharp waveform including a minimum of noise can be obtained by using the skim function and difference output as before. If very strong ambient light is reached, the PEAK value is monitored and the storage operation can be stopped when the PEAK value reaches a predetermined level. Namely in this case, an output waveform having enough quality can be obtained without the storage operation increasing, and a reliable coordinate calculation can be made in a comparatively small number of the storage operation times. This gives the advantage that the coordinate calculation sampling rate per unit of time becomes higher if the input light is weak (for example, the coordinates can be calculated in a higher speed of 40 points per second rather than 20 points per second in the other situation.).

Figure 11:
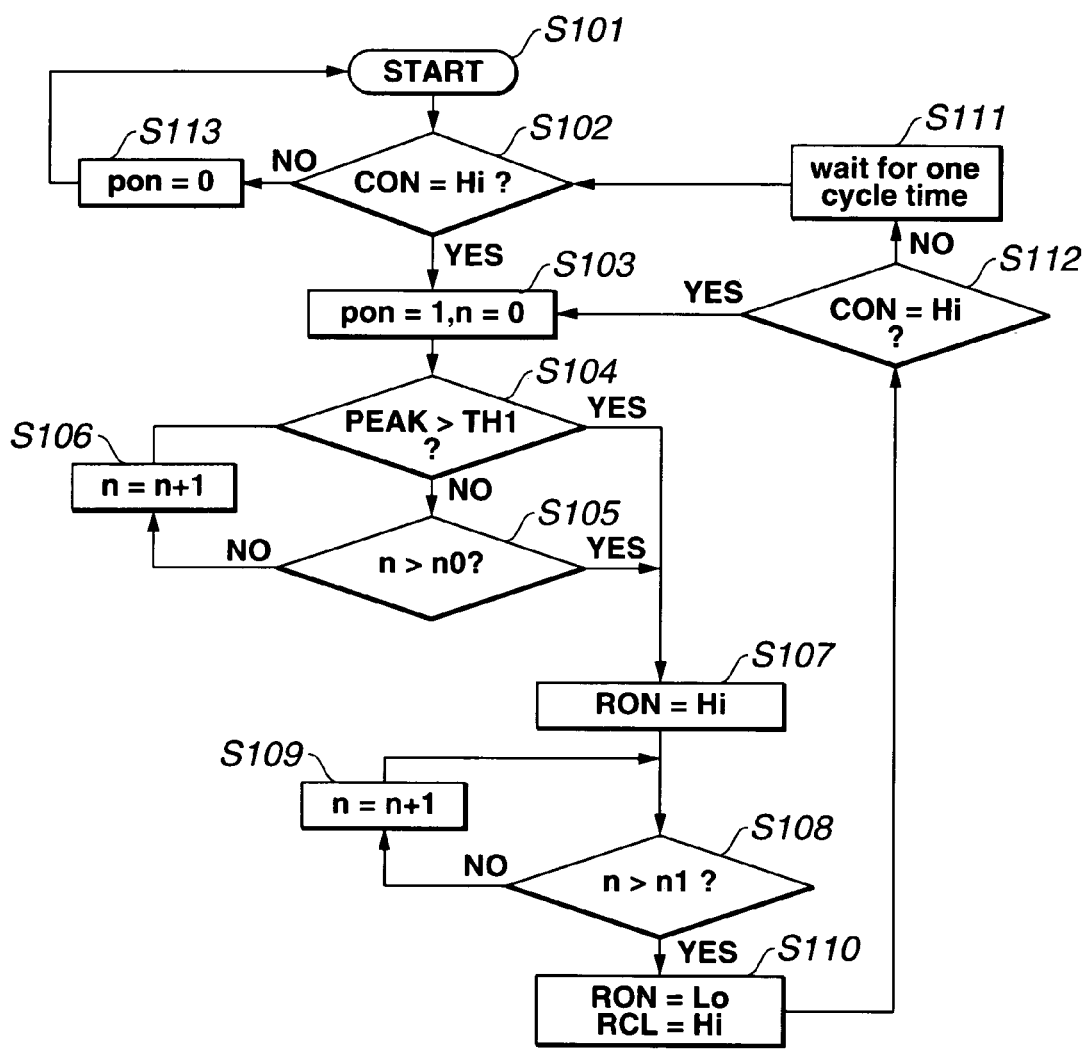
FIG. 11 is a flowchart showing a sequence of operations for controlling a linear sensor.

FIG. 11 shows a flow chart of the operation for controlling the linear sensors 20X and 20Y. At first the sensor control unit 31 starts a sensor control operation in step S101 and monitors a signal CON in step S102. If the signal CON changes to high level, a counter pon is set to 1 and sets the number of storage times n is set to 0 in step S103. The sensor control unit judges whether a PEAK value (peak level) of sensor output is larger than a predetermined value TH1 or not in step S104.

If the peak value is smaller than TH1, the flow passes to step S105 where it is determined whether the number of storage times n is more than a predetermined number of times no. If it is not, the flow shifts to step S106 and increments the number of storage times n by one and returns to step S104. The flow shifts to step S107 after the PEAK value becomes bigger than TH1 or the number of storage times n is more than a limit value n0, and then the integral operation stops. A coordinate calculation operation by the coordinate calculation unit 32 then starts. The coordinate calculation is described below.

After that, if the counter n is over a second predetermined number of times n1 in a loop of step S108 and step S109, the integral stop signal RON changes to low level, at the same time the sensor reset signal RCL is in high level for a number (two in FIG. 8) of cycle periods of the signal LCK (step S110). After that the flow shifts to step S112 and the operation is repeated while the signal CON is in high level then the coordinate calculation is done in each cycle controlled by the predetermined number of times n1.

Step S111 is for keeping at least one signal CON from dropping due to the influence of dust. If the signal CON is at low level for two consecutive cycles, the flow shifts from step S102 to step S113, the counter pon is reset to 0, and the flow returns to step S101 after a sync waiting condition has been made.

This dropout countermeasure operation can be longer than one cycle, and it is also removed if ambient background is negligible. If this cycle changes to a natural number of times the cycle of the data block described above, it corresponds to the timing of the sync code and not the signal CON, but if a sync code detection signal is used, similar operation can be realized.

The same effect can be obtained by using a natural number times of the data block as one cycle, synchronizing the timing with the sync code timing and using a detection signal of the sync code in place of the signal CON. The light of the designation device 4 reaching the coordinate detection device 1 changes, in response to a consumption of an electric source (changing electric battery voltage) arranged in the designation device 4, and also in dependence on the orientation of the designation device 4. Especially if a light diffusion of the screen 10 is low and the front brightness of the displayed image is increased, however, the change of luminous energy input to the sensor varies depending on the relative positions of the light spot and the designation device 4. But in this embodiment, even in this case, the number of integration times is varied automatically to compensate for this effect, and a stable output signal can be obtained at all times. This brings the result that reliable coordinate detection can be obtained. If the beam of the laser pointer is pointed directly at the sensor, then a strong light is input, but even in this case, the stable coordinate detection can be obtained clearly.

If a pen having an LED light source is used in a direct screen contact condition and the laser pointer is used, since the LED will have a larger luminous energy, then the number of integral times n0 and n1 shown in FIG. 11 can be adjusted, depending on whether the active designation device is a pen or a pointer. In this case, the determination as to whether the designation device is a pen or a pointer can be realized based on the ID signal supplied by the respective designation device when active. This allows high speed sampling to be used when the pen is active and low speed sampling to be used for the pointer. In practice, a delicate drawing operation such as character input can not be done by the pointer. Better use of the pointer can be obtained in smooth line drawing operation provided by low sampling rates.

As above, a high frequency control signal is added to the flashing light, and the integral operation timing is controlled by the predetermined cycle decode signal obtained by the frequency detection of the carrier. Then the designation device and the image input unit are synchronized in a wireless condition, and a useful coordinate input device can be realized.

The use of a laser beam allows a user far from the screen to operate the display easily. By the integral control unit stepping the integral operation in response to a detection that the peak level in the difference signal from the integrating unit is over the predetermined level, the signal of the light spot image having a stable level can be generated even if the luminous energy has changed. Therefore, stable and reliable detection coordinate calculation results can be obtained at all times. The method for keeping the quality constantly independent on the amount of luminous energy input to the sensor was described above, but one problem has risen. The luminous energy changes in response to the consumption of the electric source (electric battery) arranged in the designation device 4, and also the luminous energy changes in response to the orientation of the designation device 4 relative to the screen, namely a tilt of the designation device by the usual writing operation for inputting a coordinate, and a conversion efficiency difference between each sensor or light emission element etc. is expected as above. If the light incident on the detector is decreased, the signal waveform having good quality can be obtained by setting a longer integral time dependent on incident light levels namely by setting a bigger n0 and n1 and increasing the times of integral operation. However, the increase of the time of integral operation leads to a decrease of a coordinate sampling rate namely in the number of coordinates calculated in a unit of time, and then there is a limit for recreating a user's writing accurately as a coordinate input device of this invention. For example, if a sampling rate of 25 points per second is necessary for accurately recreating writing, the time for one coordinate calculating operation must be 40 msec or shorter and the peak level must reach the predetermined peak level of the signal waveform in the available integral time. But if a coordinate having a high reliability for the operator can be obtained even if the predetermined peak level can not be obtained, a designation device having good writing properties for the operator can be realized, for example, the tilt of the designation device can be bigger, or battery life may be increased. This invention is for that purpose, and the operation is described below.

(Coordinate Calculation)

The coordinate calculation operation in the coordinate calculation unit 32 is described below.

The output signal (difference signal from amplifier 29 in FIG. 6) for each of the linear sensors 20X and 20Y as above is sent to the coordinate calculation unit 32 after conversion to a digital signal by the AD conversion unit 31A arranged in the sensor control unit 31, and a coordinate value is calculated. At first, the coordinates of sensor (X1,Y1) corresponding to each output data of the X coordinate and the Y coordinate are obtained in the coordinate value calculation. Only the calculation related to the X coordinate will be described below, since the calculations related to the X coordinate and the Y coordinate are similar.

Figure 12:
FIG. 12 is a flowchart showing coordinate calculation processing according to a first embodiment.

FIG. 12 is a flowchart showing coordinate calculation processing according to a first embodiment. The coordinate calculation processing starts, and the variable cont is set to 0 in step S201. The variable cont is used in standard point setting mode (as described below). The difference data Dx(n) (the number of pixels n=64 in this embodiment) means a signal representing the difference between the output value of a pixel in the light emission state and light non-emission state. For each pixel of a desired coordinate input position (a predetermined, known position in a standard point setting mode as described below) the difference data Dx(n) is obtained in step S202 and stored in a buffer. The Dx(n) data for each pixel is compared with a predetermined threshold value V, and a data value Ex(n), which is an excess value being over the threshold value, is obtained in step S203 for each pixel.

The coordinate X1 on the sensor is calculated by using the Ex(n) data from step S204. For this calculation, a centroid position of output data is used in this embodiment, but alternative calculation methods such as peak value calculation, for example by differentiation, can be used.

The mode of coordinate calculation processing is decided in step S205. A predetermined reference value must be decided before a calculation for a coordinate based on a centroid position X1 of output data, and the predetermined reference value calculation (reference point setting mode) is described below.

The light spot from the designation device 4 is sequentially positioned at two setting points on the screen 10, which have known X coordinate and Y coordinate values $\alpha 0$, $\beta 0$ and $\alpha 1$, $\beta 1$, and the steps S202–S204 are operated to obtain two respective centroid values $X1_0$, and $X1_1$ on the X direction sensor. The centroid values $X1_0$ and $X1_1$ and the known coordinate values $\alpha 0$ and $\alpha 1$ are stored in step S210. The operation is repeated twice to obtain signals $X1_0$ and $X1_1$ corresponding to positions $\alpha 0$ and $\alpha 1$.

In the normal coordinate calculation mode, the X coordinate of the coordinate input point is calculated in step S206 by using the values ($X1_0$, $X1_1$, $\alpha 0$ and $\alpha 1$) stored in step S210, in accordance with the formula of step S206. If necessary, a coordinate correction, for example a distortion correction by software calculation to compensate for an aberration of the optical lens, is done, and the corrected coordinate value is output from step S207 because a higher level coordinate input device can be supplied.

The Y coordinate calculation is performed in the same way, using the values $\beta 0$ and $\beta 1$ instead of $\alpha 0$ and $\alpha 1$.

In the above processing, calculated and optionally calculated coordinates can be output in real time or the coordinates can be thinned out responding to the purpose, for example, one output out of every ten calculated coordinates actually being used. The choice is important in the cases below.

The user's hand stability differs depending on whether the designation device 4 is used as a pen or as a pointer. When using a pointer to project a spot onto the screen from afar, the light spot trembles on the screen, and this trembling should be repressed for better use. When used as a pen, tracking of the light spot is required to be as accurate and as quick as possible. Especially if a character is written, quick operation is necessary for accurate input.

Since an ID is transmitted by using control signals in the embodiment of FIG. 2, it can be determined whether the device is used as a pointer or a pen by detecting whether the end switch 43B is pressed or not. When the device is used as a pointer, a current output coordinate (X,Y) may be obtained by extrapolation from the previous coordinate values (x-1,Y-1) and the coordinate values (X-2,Y-2) preceding them. A useful structure having little error is realized. The movement mean is used in this embodiment, but other methods wherein the absolute value of the difference in position is nonlinearly compressed according to its size, or wherein a difference with a calculated value obtained by a movement mean has been nonlinear compressed, can be used as functions used in the smoothing process. Switching the smoothing operation to strong when the designating device 4 is used as a pointer or to weak when it is not used a pointer may be effected by the control signal to optimize use conditions in both cases.

The available time to finish the calculations is 10 msec, and if the coordinate sampling frequency is 100 Hz as below, then the source data, which has 64 pixels×2 (for x and y coordinates, respectively)×AD conversion unit 8 bits, is very little. Further, a low speed 8 bits 1 tip microprocessor can process the data since convergence calculation is not necessary. This is effective for low cost, easy specification changing, short period development and easy development of derived products. Especially since the development of a special LSI for high speed image processing is unnecessary, the development cost and period is reduced. It has been described above to use an area sensor as an example.

The data signal showing the coordinate value (X, Y) obtained by the calculating operation is sent from the coordinate calculation unit 32 to the communication control unit 33. The communication control unit 33 inputs the data signal and the control signal from the control signal detection unit 72. The data signal and the control signal are converted to a communication signal having a predetermined form and transmitted to a display control device outside. Therefore, the cursor, menu, character and line on the screen can be operated. As above, even if the sensor having 64 pixels is used, sufficient detection accuracy is achieved, the sensor and optical system are low in size and cost, and the calculation circuitry is also very small in the coordinate input apparatus.

The linear sensor 20 having a plurality of photoelectric conversion elements arranged on a line is described above, but another sensor comprising a two dimensional array of photoelectric conversion elements may be used for coordinate detection. In this case, condenser lenses for making a shaded off image are used instead of cylindrical lenses 90X and 90Y. Output signals of the photoelectric conversion elements are stored in memory, with the 2-dimensional position data of the respective photoelectric conversion element. The pixel having the maximum difference signal is found, and its position coordinates are obtained, based on the stored signals. The threshold value may be calculated based on the difference signals corresponding to pixels positioned on or within a circle which has a center at the peak pixel, or on the basis of a difference value from pixels in or on another closed curve surrounding the peak pixel or in a region surrounding the peak pixel.

If an area sensor is used as a sensor, four times the number of pixels and calculation data is necessary for coordinate detection in two axial directions. However, if linear sensors are used, only twice the number of sensor pixels provided for each axis is sufficient. In other words, for a sensor having N pixels on each axis, linear sensors require the use of 2N pixels whereas an area sensor is required to have $N^2$ pixels. Therefore, more accurate detection is realized at lower cost by increasing the number of pixels in the linear arrays.

As described above, the signal of the light spot flashing on and off in a predetermined cycle from the designation device 4 is integrated separately in each state, light emitting state and light non-emitting state, and the difference signals are obtained for achieving an accurate determination of the position of the peak pixel in this embodiment. This enables an apparatus with high accuracy and high detection coordinate value reliability to be obtained. The influence of ambient light is reduced, and the apparatus is small, light and low cost.

In the first embodiment, the difference data Dx(n) are compared to a fixed threshold TH1 corresponding to a voltage value V in the coordinate calculation operation shown in FIG. 12. Therefore, if the PEAK value of Dx(n) does not exceed TH1 after the integration has been done n0 times in the operation of FIG. 11, namely if the luminous energy is not enough, the accuracy of coordinate detection is decreased. If n0 is increased so as to achieve enough luminous energy, it results in decreased detection speed. This second embodiment takes measures to overcome this problem.

As described in the first embodiment, the light from the light emitting element 41 arranged in the designation device 4 can be detected as a stable signal by the integral operation of sensor 20. But if the luminous energy reaching to the sensor 20 is decreased, the number of times the integration operation must be repeated to bring a peak level of the detection signal to a predetermined level is increased, and the coordinate calculation sampling rate (the number of positions can be calculated every unit time) is decreased. At least a tens of points per second sampling rate, if possible one hundred points or more per second, is expected to recreate a user's writing accurately with the coordinate input device. If an LED is used as the light emitting element 41 in the arrangement of the embodiment of FIG. 2, only a few percent of the luminous energy emitted by the LED can reach sensor 20 in the worst case. This is confirmed by experimentation simulating real use or manufacturing conditions (various differences between individuals are expected). Although the luminous energy of an LED can be increased by increasing forward current, the electrical source (electric battery) 44 arranged in the designation device 4 is consumed and the battery life becomes shortened.

However, a rechargeable battery or mains supply can be used as the electric source unit for solving the problem, but these sources are inconvenient in use for a user because either the number of charge times is increased or the designating device has a trailing cord. There is thus a limit to the practicable increase in the luminous energy of the light emitting element 41. This second embodiment can alleviate the problem, and is described in detail below.

In this embodiment, accurate coordinates can be detected even if the peak value of the signal output from the sensor doesn't reach TH1 when the predetermined integral operation, for example the number of integral times n0 and n1 are set to achieve 10 m/sec as a maximum integral time for one sample in order to achieve one hundred points per second as coordinate sampling rate, is completed.

Figure 13:
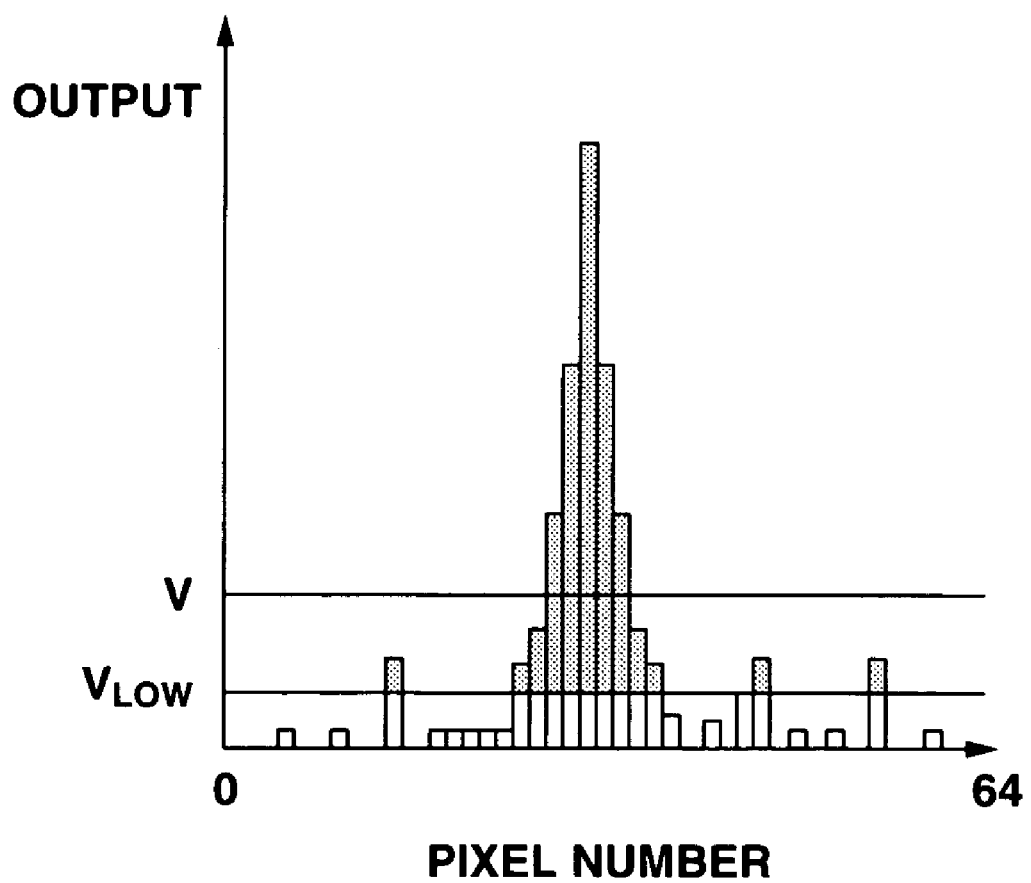
FIG. 13 is a diagram showing an example of the outputs of the elements of a linear CCD sensor.

FIG. 13 is a diagram showing an output level of each pixel in a sensor. Generally, the effective data is determined by using threshold level V. If the threshold level V is set to have a sufficient margin from the noise level in a condition that the output signal is obtained enough, then a stable coordinate can be calculated without the influence of noise. To set a lower threshold level is better since a decrease of detection signal level responding to a lack of luminous energy may occur depending on a real use condition as above. For example, a coordinate can be calculated with a smaller level of output signal if the threshold level is set to Vlow, but the calculation accuracy is decreased because the influence of noise becomes strong.

Figure 16:
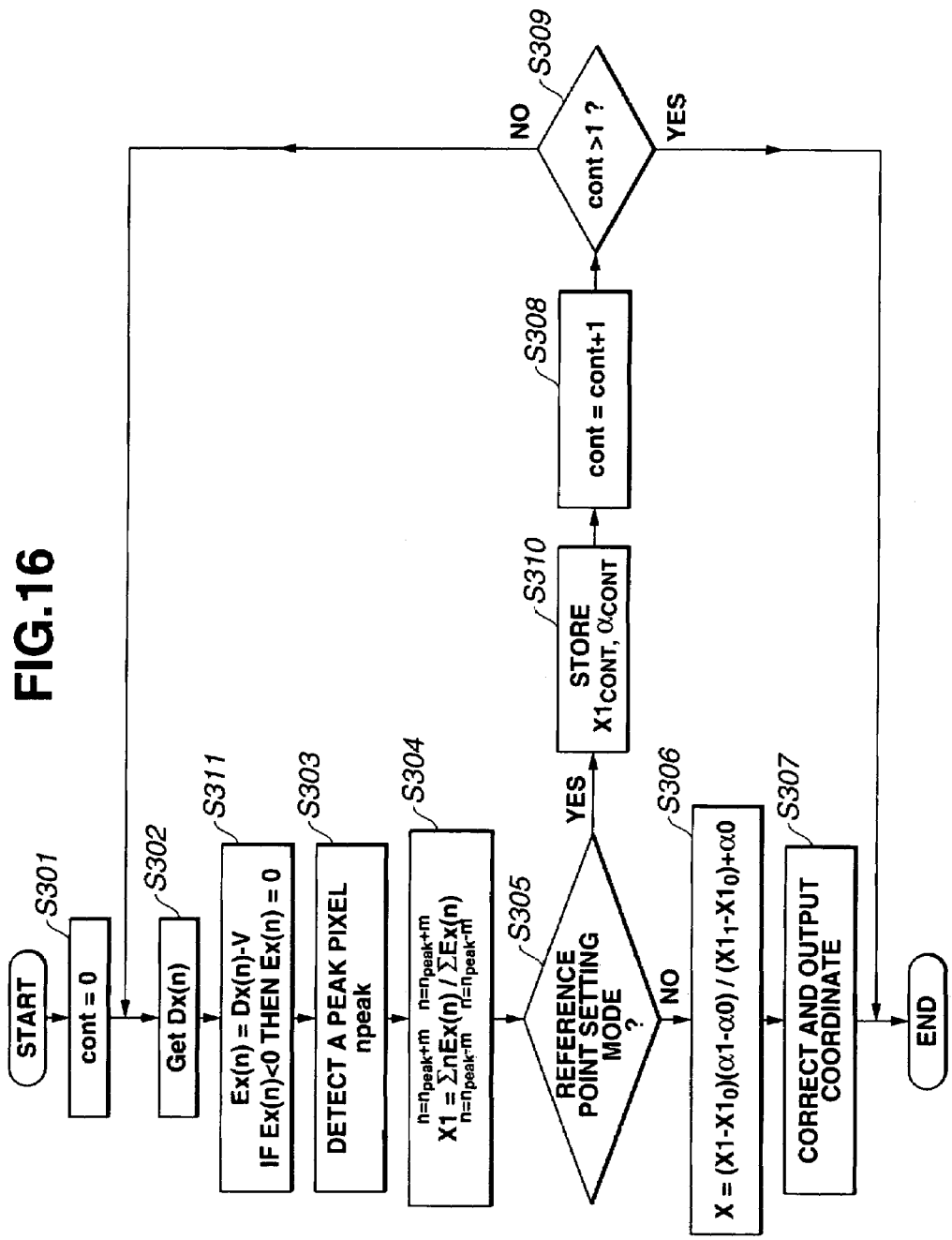
FIG. 16 is a flowchart showing a coordinate calculation processing according to a second embodiment.

FIG. 16 is a flowchart showing a coordinate calculation processing according to this embodiment. The coordinate calculation excluding an influence of noise by decreasing the threshold level is explained in the processing in FIG. 16.

After the process starts, a variable cont is set to 0 for initializing in step S301, and a difference data Dx(n) (the number of pixels n=64 in this embodiment), which is a difference signal at each pixel of desired coordinate input point, is read out in step S302. The values of Dx(n) are compared with the threshold value in step S311, and Ex(n) is stored for each pixel in a buffer. The operation in the steps S301, S302 and S311 is the same as the steps S201–S203 described above with reference to FIG. 12.

Next a pixel where the output signal $n_{peak}$ is greatest is detected in step S303. The coordinate on the sensor X1 is calculated according to the equation below by using the maximum output signal $n_{peak}$ and data of m adjacent pixels on either side of the pixel having output value $n_{peak}$ in step S304. Therefore the number of pixels used is 2m+1.

The coordinate calculation is effected using the formula:

$$X1 = \sum_{n=n_{peak}-m}^{n_{peak}+m} nEx(n) \bigg/ \sum_{n=n_{peak}-m}^{n_{peak}+m} Ex(n) \qquad (1)$$

set out in step S304.

Other steps S305–S310 are the same as S205–S210 described above, and their description is omitted here for brevity.

An efficiency of centroid calculation shown in step S304 is described with reference to FIG. 15. FIG. 15 illustrates the accuracy of the calculation method of the prior art (left hand column) wherein a centroid is calculated using all the pixel difference signals, and also illustrates the method of the second embodiment using various volumes of m pixels (i.e., differing numbers of pixels on either side of the peak pixel) to calculate the centroid. The actual coordinate position of the light spot and a detected coordinate at that point are compared and a difference, namely coordinate calculation accuracy, is obtained for each point in an array of ten thousand points over the screen area. The calculation methods and conditions are shown along the horizontal axis, and the calculated coordinate accuracy is shown on the vertical axis. Max means a maximum value of the calculated differences at the ten thousand points, and the precision means a value Avg+3σ obtained based on a mean value Avg and a standard deviation "σ" of the distribution of the obtained differences in FIG. 15.

If the threshold voltage is set to 0.75V and the coordinate is calculated according to the operation shown in FIG. 12, then not only is the Max of the accuracy decreased badly but also there are some areas where coordinates can not be calculated because of a lack of luminous energy in the figure. The accuracy of coordinate calculation comes to be high at higher threshold levels, but the uncalculatable coordinate area expands. If the value m is set at about 4, then by using the calculation method shown in FIG. 16, the coordinate calculation can be done in all areas, and a good enough calculation result can be obtained.

Higher efficiency in the coordinate calculation operation, even if the signal level output from the sensor is small, and a highly accurate coordinate input device can be obtained, with a higher sampling rate of coordinates by the reduction of the integral period, than the calculation operation shown in FIG. 12. The life of the battery 44 in the designation device 4 may be extended by making LED light emitting weaker.

The Third Embodiment

Figure 14A:
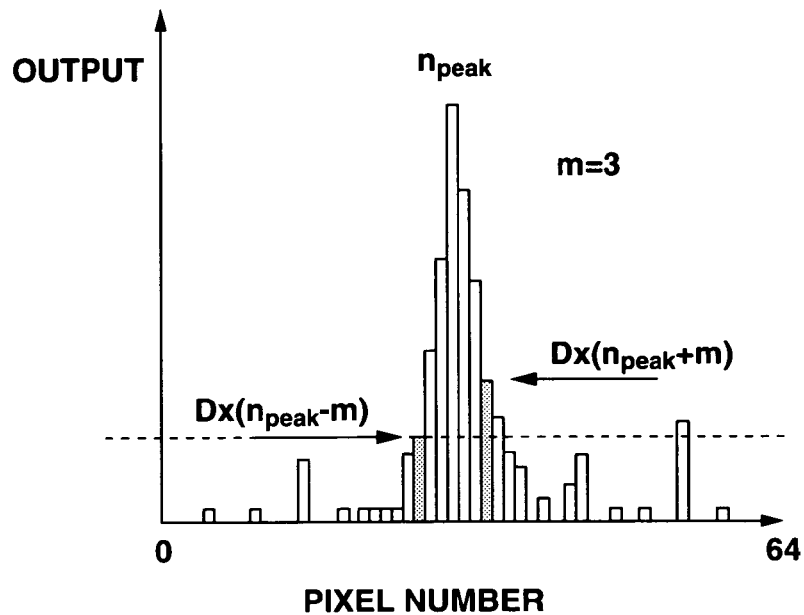
FIGS. 14A and 14B are diagrams showing examples of the elements of a linear CCD sensor, with FIG. 14A illustrating the setting of a threshold value, and FIG. 14B showing an extraction of effective pixels.
Figure 17:
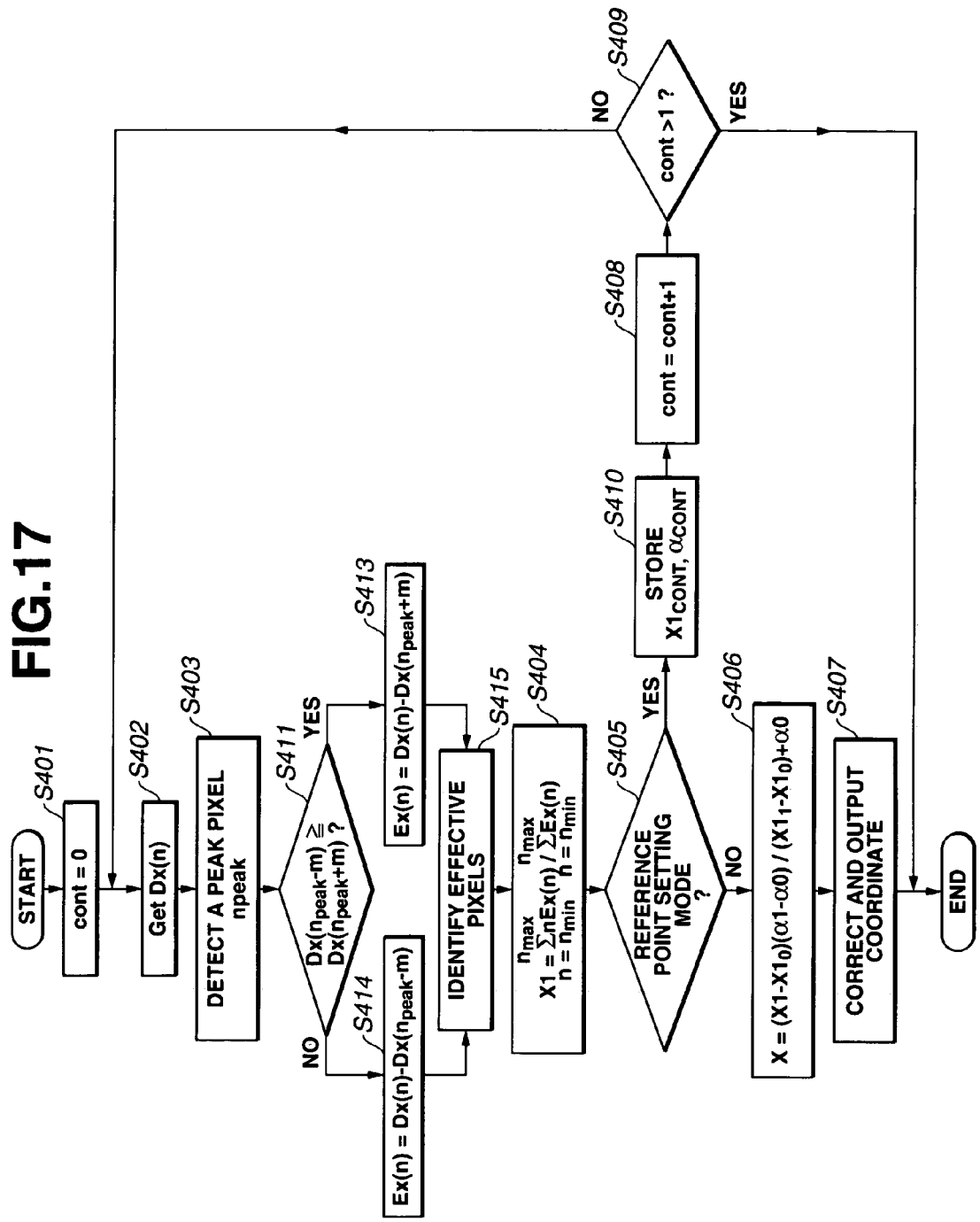
FIG. 17 is a flowchart showing a coordinate calculation processing according to a third embodiment.

FIG. 17 is a flowchart showing a coordinate calculation processing according to the third embodiment. After the processing has started in FIG. 17, a variable cont is set to 0 for initializing in step S401, and difference data Dx(n) corresponding to a difference signal at each coordinate input device is read out and stored in the buffer in step S402. Next, a pixel $n_{peak}$ where output signal becomes maximum is detected in step S403, m-th pixels in each direction forward and backward from the pixel $n_{peak}$ are selected, and the signal levels of both selected pixels Dx($n_{peak}$–m) and Dx($n_{peak}$+m) are compared in step S411. The smaller of the signal levels is set as a threshold value based on the comparison, and the output signals of each of the pixels are compared with the threshold value in step S413 or step S414. The smaller one is set as the threshold value in this embodiment, and FIG. 14(A) shows a case where m=3. In the figure, it is clear that the threshold value is set at Dx($n_{peak}$–m).

Figure 14B:
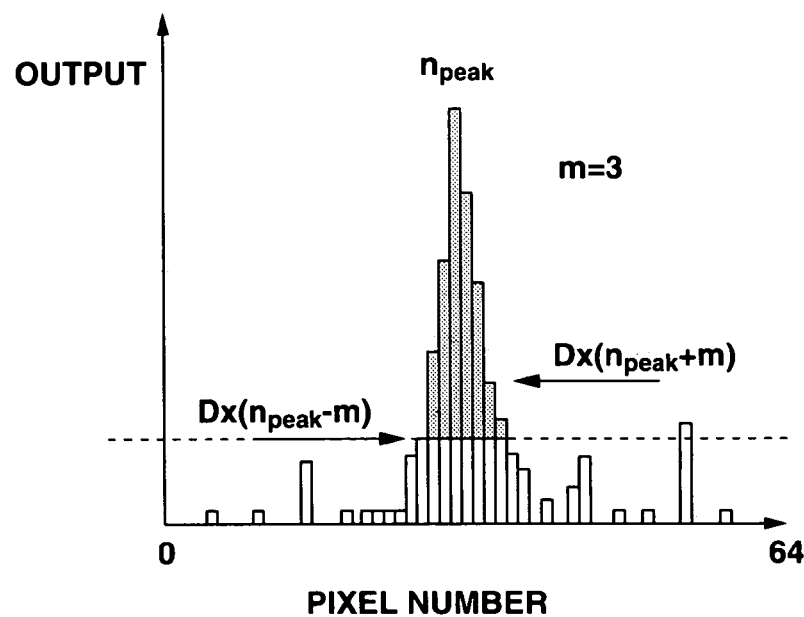

Next, the effective pixels for the centroid calculation are determined in step S415. Now the effective pixels determination is explained. If data Ex(n) for pixel n derived by the operation above is positive, it is clear that the signal output at pixel n is over the threshold level. But since the set threshold level is a changeable threshold value that is changed with the signal outputs from pixels on either side of the peak value, the set level can be a noise level in the weak luminous energy condition. If a noise signal is outputted at a pixel far enough from the pixel $n_{peak}$, it is calculated as a moment (a term of nEx(n)) even if the signal component is small. Therefore, the error is not a little effective. Then, in this embodiment if Ex(n) is positive for a pixel n, only output signals from pixels in a series having consecutive pixel numbers and including the maximum pixel $n_{peak}$ are determined as effective pixels, and the minimum value $n_{min}$ and the maximum value $n_{max}$ of the pixel numbers ($n_{min} < n_{peak} < n_{max}$) of pixels being used in the calculation are selected in step S415. The selected effective data are shown in FIG. 14(B). The threshold value is changeable, and the number of pixels used in this calculation is changeable, however, both are fixed in the operation of FIG. 16. Next, the centroid position X1 is calculated based on the equation below by using only the effective pixels selected in step S415, namely the pixels whose numbers lie between $n_{min}$ and $n_{max}$ in step S404.

$$X1 = \sum_{n=n_{min}}^{n_{max}} nEx(n) \bigg/ \sum_{n=n_{min}}^{n_{max}} Ex(n), \qquad (2)$$

The operation in steps S405–S410 are the same as the steps S205–S210 above, and their description is omitted here. Now, an effect obtained by the centroid calculation is described.

Figure 18:
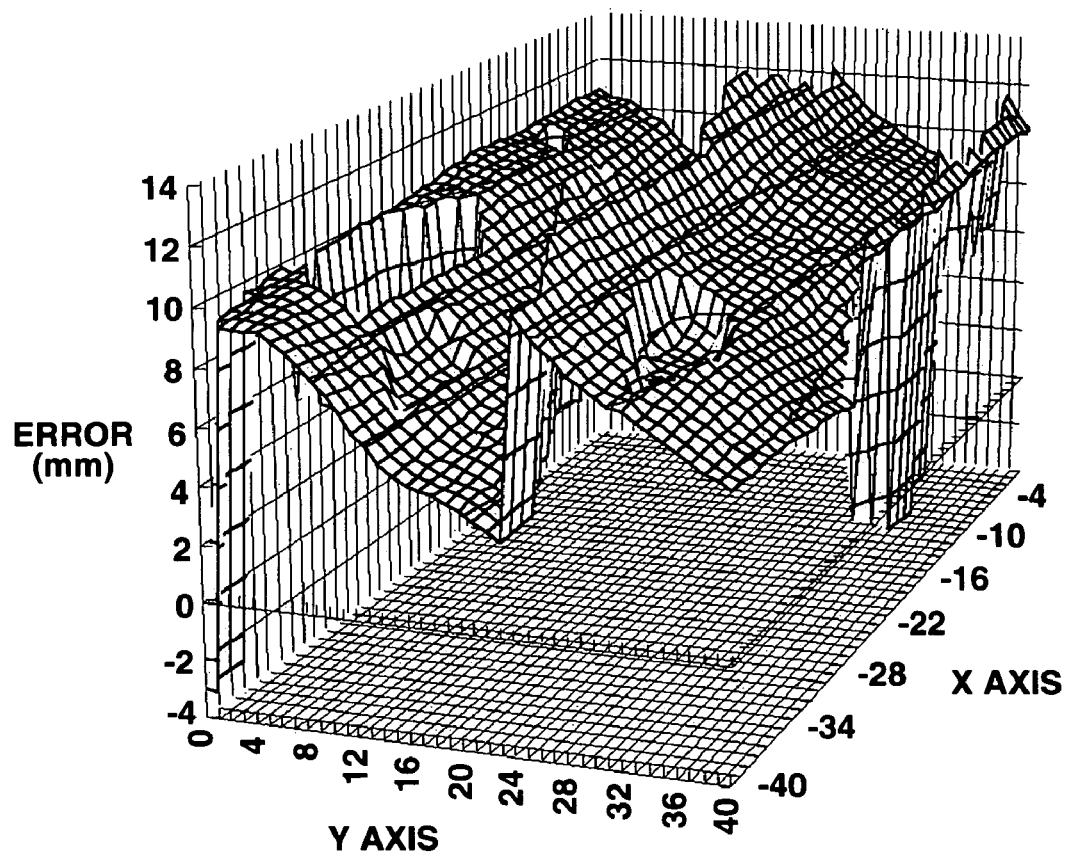
FIG. 18 is a diagram showing the relationship between coordinate calculation precision and XY position, using the calculation processing of the second embodiment.
Figure 19:
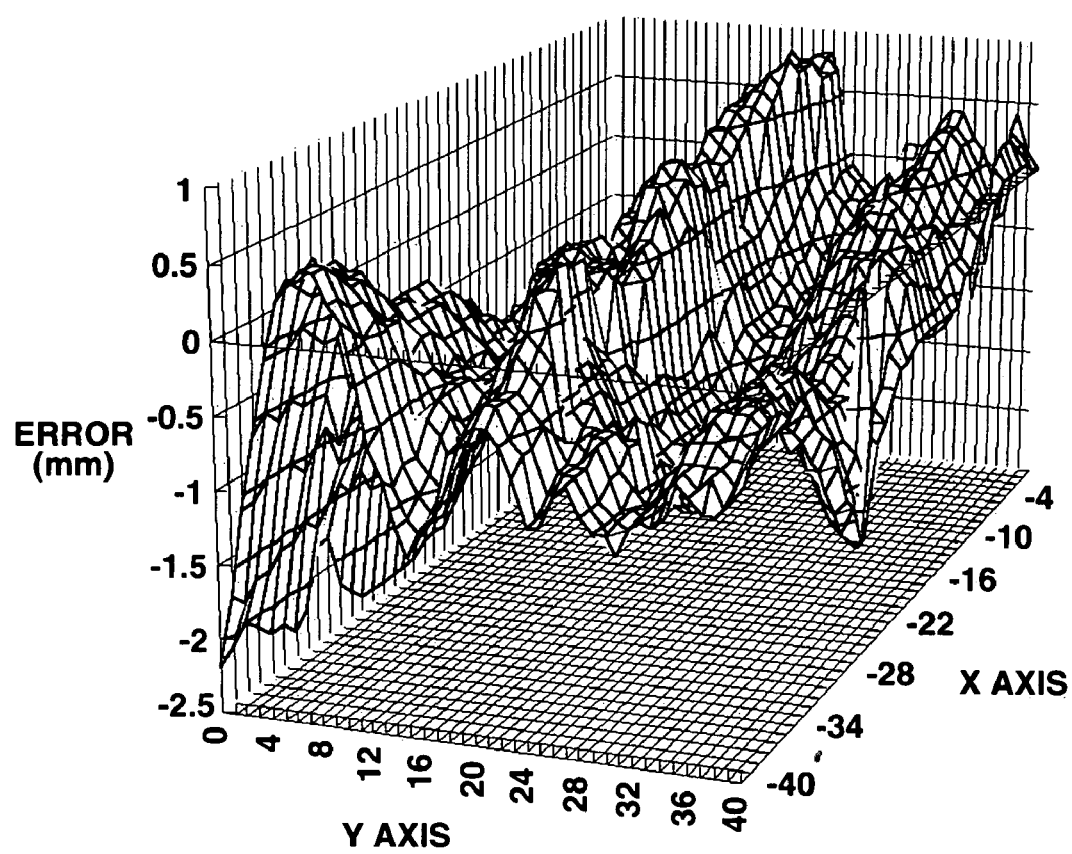
FIG. 19 is a diagram showing the relationship between coordinate calculation precision and XY position, using the calculation processing of the third embodiment.

FIG. 18 and FIG. 19 show output results examples of coordinate calculation precision in a part of a coordinate input apparatus (40×40 mm) having a 1200×900 mm coordinate input effective area size. The X axis and Y axis correspond to the position designated by the input pen 4, and the Z axis shows a difference between the Y coordinate value outputted by the coordinate input apparatus and the Y coordinate value corresponding to the real input position in the figure. Therefore, where the difference is about 0, the accuracy of the coordinate input apparatus is very high. FIG. 18 shows the result of the coordinate calculations made in accordance with the operation shown in the flowchart of FIG. 16. Likewise, FIG. 19 shows the result of the coordinate calculation made in accordance with the flowchart in FIG. 17. However, the measurement error of the calculation method of FIG. 16 is approximately 10 mm, while the error of the calculation method of FIG. 17 is better, decreased to about 2–2.5 mm. Also, the step effect shown in FIG. 15 has not been generated, and the distribution of error is smooth. This means that the calculation method of FIG. 17 brings better detection in the coordinate input apparatus than the calculation method of FIG. 16, and it's clear that the coordinate input apparatus can obtain a high accuracy and a high detection.

The smaller one of the m-th pixels spaced in each direction backward and forward from the pixel $n_{peak}$ having the maximum difference data is selected as a threshold value used for the effective pixel extraction in step S415 in the above embodiment. Alternatively, the value of the threshold may be set to be the bigger of $Dx(n_{peak}+m)$ and $Dx(n_{peak}-m)$ in the above threshold value setting stage, and then a higher signal level is selected as the threshold level. In a further alternative, the threshold value can be determined by, for example, calculating the means of the 2 m+1 values of difference data corresponding to the pixel $n_{peak}$ having the maximum difference data and next m pixels in each direction backward and forward from that pixel, and setting the threshold to this mean value or to a multiple or submultiple thereof.

In the above embodiment, the difference signal is calculated by using the integral calculation of a signal, which is a flashing light having a predetermined cycle from the designation device 4, separately in the light emission state and in the light non-emission state, and the pixel having the maximum difference signal (the pixel number $n_{peak}$) is detected. The threshold value for deciding the effectiveness of each pixel is set by using the m-th pixels in each direction backward and forward from the detected pixel $n_{peak}$ or 2 m+1 pixels corresponding to m pixels in each direction backward and forward of the detected pixel. The effective pixels are selected by using the set threshold value, and the coordinate is calculated by using the output data of the selected pixels. Therefore, a coordinate input apparatus having high accuracy and high detection reliability can be obtained.

The Fourth Embodiment

In this embodiment, a determination is made as to whether or not the set threshold value is effective for identifying the receiving light, which is the light emitted from the light source arranged in the designating device. The determination provides higher accuracy and reliability in coordinate detection. If the products using the sensor are manufactured in quantity, the differences between products and their parts should be considered. Especially, the output voltage when no light reaches the sensor, namely output voltage in a dark condition, is a problem. The output voltage in a dark condition usually varies by plus and minus dozens of percent from the nominal value, due to manufacturing tolerances. The distribution is from about 0.7 V to about 1.3 V depending on the difference between each product if the electric source voltage is 5 V and it is assumed that the nominal output voltage in a dark condition is 1 V. Therefore, the threshold level must be set at 1.3 V or higher, but in this case, a situation that a product having a output voltage in a dark condition of 0.7 V is operated at a threshold voltage of 1.3 V may occur. Namely, the coordinate can not be calculated when the luminous energy is weak and only the peak level reaches 1.3 V. Contrary to that, the confidence of coordinate calculation is low, and a higher threshold value must be set since the threshold value set at 1.3 V provides no margin against the noise for components in the product having an output level in a dark condition of 1.3 V. Therefore, if the product tolerance is considered, the setting of the threshold level depending on parts tolerances is necessary, and the need for adjustment of every product increases costs. For removing this influence, in FIG. 20, the operation starts in step S501, and difference data Dx(n) (the number of pixels n=64 in this embodiment), which is a difference signal at each pixel of desired coordinate input point, is read out in step S502. The mean of the output signals from all of the pixels (64 pixels) is calculated, and the mean value is added to a predetermined offset amount Voff to define a first threshold value Vth1 (step S503). The first threshold value is used for determining the effectiveness of output signals (See FIG. 13(B)). Namely, Vth1 be changed in dependance on the luminous energy input to the sensor, namely the signal level, and on the output voltage in a dark condition, then the product's tolerance of each sensor is considered, and the best threshold level is set automatically.

Next, a pixel $n_{peak}$ having a maximum value of the difference data Dx(n) is detected in step S504, and $Dx(n_{peak}-m)$ and $Dx(n_{peak}+m)$, which are output values of the m-th pixels in each direction forward and backward from the pixel $n_{peak}$, are obtained, and these values are compared in step S505. Next, a second threshold value Vth2 is set based on the comparison result in each of steps S506 and S507. The smaller value of $Dx(n_{peak}+m)$ and $Dx(n_{peak}-m)$ is set as the second threshold value Vth2 in this embodiment, and, in the case of m=3 shown in FIG. 13(C), then the threshold value Vth2 is set at $Dx(n_{peak}-m)$. Although the smaller signal level is set as the threshold level in this embodiment, the larger value may be set as Vth2 so that a higher signal level is set as the threshold level.

Next, the first threshold level Vth1, and the second threshold level Vth2 are compared in step S508. If the second threshold level Vth2 is bigger than the first threshold level Vth1, then it can be concluded that sufficient light is incident on the sensors for a coordinate calculation to proceed, and the coordinate calculation is executed. However, if Vth2 is smaller than Vth1, the necessary amount of light to detect coordinate values is not present, the operation stops, and the flow returns to step S501.

The Dx(n) of each pixel is compared with the second threshold value Vth2 in step S509, and Ex(n) is stored in a buffer. Next, only the series of consecutive pixels exceeding the threshold Vth2 and including the peak pixel number $n_{peak}$ are selected in step S510, and the coordinate on the sensor X1 is calculated. Where operations correspond to steps in earlier methods, corresponding numbering is used, and the description is omitted.

Figure 21A:
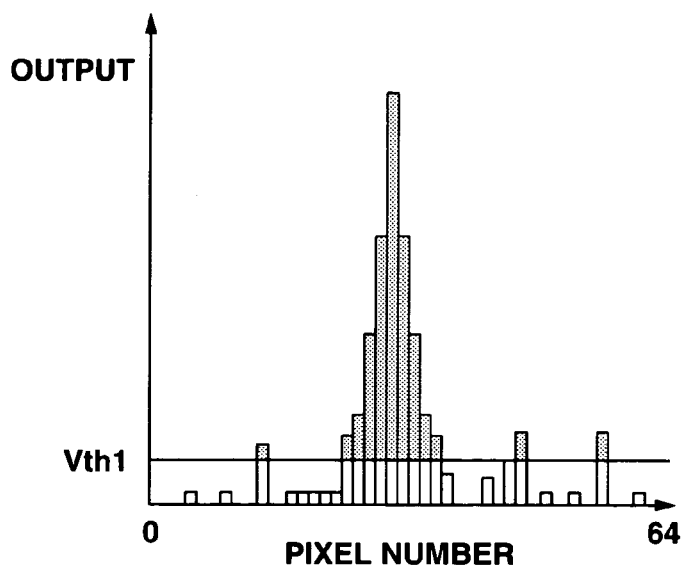
FIGS. 21A to 21C are diagrams showing examples of modes of selection of effective pixels.
Figure 21B:
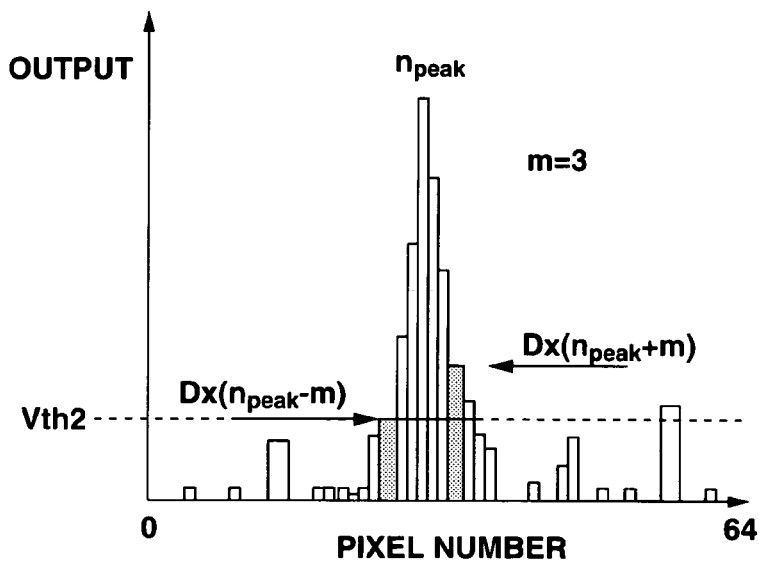
Figure 21C:
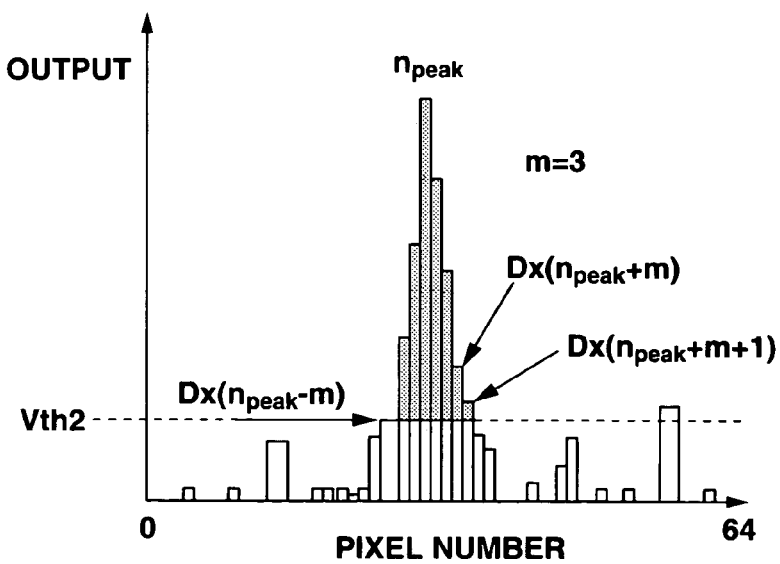

The effective pixels determined in step S510 of this embodiment are shown in FIG. 21C. Since the second threshold value Vth2 has been set at $Dx(n_{peak}-m)$ (the value of the $n_{peak}-m$ pixel), the output value of not only $n_{peak}+m$ pixel but also $n_{peak}+m+1$ pixel in the case of the Figure is used for the coordinate calculation as an effective pixel. The first and second threshold values are changeable, and the number of pixels used in the calculation is changeable, however, both are fixed in the operation of FIG. 16.

Figure 20:
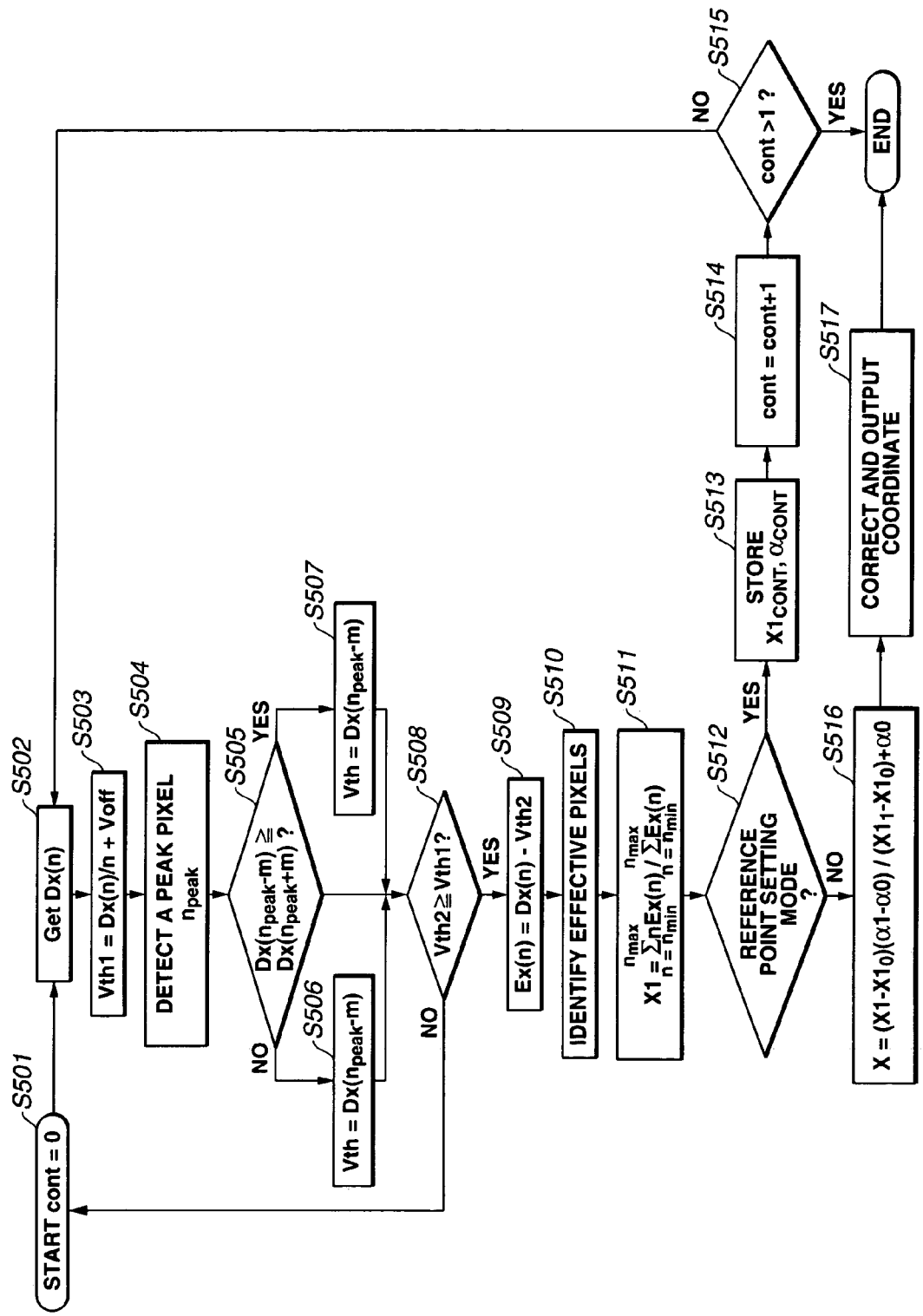
FIG. 20 is a flowchart showing a coordinate calculation processing according to the fourth embodiment.
Figure 22:
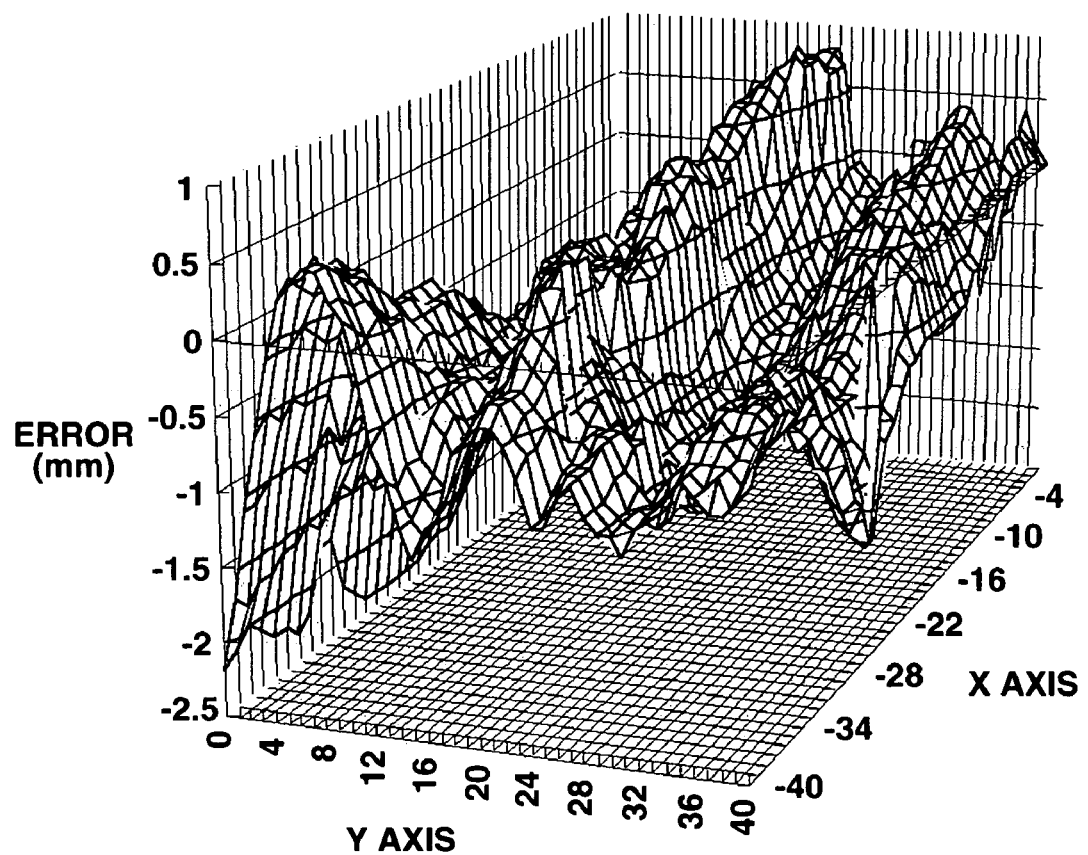
FIG. 22 is a diagram showing the relationship between coordinate calculation precision and XY position, using the calculation processing of the fourth embodiment.

FIG. 22 shows the coordinate calculation precision of a part (40×40 mm) in a coordinate input apparatus having a 1200×900 mm coordinate input effective area size in the case of this embodiment. In this Figure, because the distribution of error is smooth, the calculation of FIG. 20 is better detected in the coordinate input apparatus shown, and the coordinate input apparatus can obtain a high accuracy and a high detection by the calculation. The coordinate input method and devices of the invention can be embodied in one or more parts of a system constituted by a plurality of devices (for example host computer, interface device, reader, printer and so on) and in a single device (for example copy machine, facsimile machine and so on).

What is claimed is:

1. An apparatus for outputting position information corresponding to light having a cyclically varying intensity, said apparatus comprising:
   a detection device that receives the light, said detection device comprising a plurality of photoelectric conversion elements, arranged in a predetermined physical array;
   difference signal generating means for generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;
   threshold setting means for setting a threshold value on the basis of a level of said difference signal obtained from each photoelectric conversion element;
   selection means for selecting effective photoelectric conversion elements by comparing said threshold value with the difference signal generated by said difference signal generating means; and
   output means for outputting the difference signals corresponding to the selected effective photoelectric conversion elements.

2. An apparatus according to claim 1, wherein said threshold setting means sets the threshold value based on the difference signals corresponding to two photoelectric conversion elements equally spaced from the photoelectric conversion element having the largest difference signal.

3. An apparatus according to claim 1, wherein said threshold setting means sets the threshold value at the difference signal corresponding to the greater difference signal of the two photoelectric conversion elements equally spaced from the photoelectric conversion element having the largest difference signal.

4. An apparatus according to claim 1, wherein said threshold setting means sets the threshold value at the difference signal corresponding to the smaller difference signal of the two photoelectric conversion elements equally spaced from the photoelectric conversion element having the largest difference signal.

5. An apparatus according to claim 1, further comprising:
   difference signal detecting means for detecting the photoelectric conversion element having the largest difference signal,
   wherein said threshold setting means sets the threshold value based on the difference signals of a predetermined number of photoelectric conversion elements adjacent to the photoelectric conversion element having the largest difference signal.

6. An apparatus according to claim 1, further comprising:
   pixel calculation means for calculating which photoelectric conversion element the light is incident on based on the difference signals outputted by the effective photoelectric conversion elements.

7. An apparatus according to claim 1, wherein said pixel calculation means calculates a centroid pixel number of a selected effective signal, further comprising position calculation means for calculating a position coordinate of a designation device based on an output result of said pixel calculation means.

8. An apparatus according to claim 1, further comprising;
   storage means for storing an output result of said pixel calculation means, which is obtained at the light of a predetermined position on the screen, and information on said predetermined position.

9. An apparatus according to claim 1, further comprising:
   first integration means for integrating the output of the photoelectric conversion element when the light cycle is at a first point;
   second integration means for integrating the output of the photoelectric conversion element when the light cycle is at a second point; and
   difference signal generating means for generating, for each photoelectric conversion element, a difference signal between the integrated output signal of when the light cycle is at the first point and the integrated output signal of when the light cycle is at the second point.

10. An apparatus according to claim 1, wherein the light comprises a light-emitting element that projects a light spot onto the screen surface.

11. An apparatus according to claim 1, wherein the light comprises a light-emitting element positioned adjacent to the screen surface.

12. An apparatus according to claim 1, wherein said detection means receives light diffused through the screen surface from the light.

13. An apparatus according to claim 1, further comprising a display device.

14. An apparatus for outputting position information corresponding to light having a cyclically varying intensity, said apparatus comprising:
   a detection device that receives the light, said detection device comprising a plurality of photoelectric conversion elements, arranged in a predetermined physical array;
   difference signal generating means for generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;
   first threshold setting means for setting a first threshold value on the basis of a mean value of output of said difference signal obtained from each photoelectric conversion element;
   second threshold setting means for setting a second threshold value to either of the difference signals outputted by a photoelectric conversion element having the largest difference signal and two photoelectric conversion elements, which are equally spaced by the predetermined number of pixels from the photoelectric conversion element having the largest difference signal;

selection means for selecting effective photoelectric conversion elements by comparing said first threshold value and said second threshold value with the difference signal generated by said difference signal generating means; and output means for outputting the difference signal obtained from the selected effective photoelectric conversion elements.

15. An apparatus according to claim 14, further comprising:

determining means for determining whether there is a designation device or not, by comparing the first threshold value set by said first threshold setting means with the second threshold value set by said second threshold setting means.

16. An apparatus according to claim 14, further comprising a display device.

17. A method for controlling an apparatus for outputting position information corresponding to light having a cyclically varying intensity, comprising the step of:

detecting by a detection device that receives the light, said detection device comprising a plurality of photoelectric conversion elements, arranged in a predetermined physical array;

generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;

setting a threshold value on the basis of a level of said difference signal obtained from each photoelectric conversion element;

selecting effective photoelectric conversion elements by comparing said threshold value with the difference signal generated in said difference signal generating step; and outputting the difference signals corresponding to the selected effective photoelectric conversion elements.

18. A method for controlling an apparatus for outputting position information corresponding to light having a cyclically varying intensity, comprising the step of:

detecting by a detection device that receives the light, said detection device comprising a plurality of photoelectric conversion elements, arranged in a predetermined physical array;

generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;

setting a first threshold value on the basis of a mean value of output of said difference signal obtained from each photoelectric conversion element;

setting a second threshold value to either one of the outputted difference signals of a photoelectric conversion element having the largest difference signal and two photoelectric conversion elements equally spaced by the predetermined number of pixels from the photoelectric conversion element having the largest difference signal;

selecting effective photoelectric conversion elements by comparing said first threshold value and said second threshold value with the difference signal generated in said difference signal generating step; and outputting the difference signals obtained from the selected effective photoelectric conversion elements.

19. A coordinate input apparatus for outputting position information corresponding to light having a cyclically varying intensity, said apparatus comprising:

a detection device that receives the light, said detection device comprising a plurality of photoelectric conversion elements, arranged in a predetermined physical array;

difference signal generating means for generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;

threshold setting means for setting a threshold value on the basis of a level of said difference signal obtained from each photoelectric conversion element;

selection means for selecting effective photoelectric conversion elements by comparing said threshold value with the difference signal generated by said difference signal generating means; and output means for outputting the difference signals corresponding to the selected effective photoelectric conversion elements.

20. A coordinate input apparatus for outputting position information corresponding to light having a cyclically varying intensity, said apparatus comprising:

a detection device that receives the light, said detection device comprising a plurality of photoelectric conversion elements, arranged in a predetermined physical array;

difference signal generating means for generating, for each photoelectric conversion element, a difference signal corresponding to a difference between an output of the photoelectric conversion element when the light cycle is at a first point and an output of the photoelectric conversion element when the light cycle is at a second point, the first point being at a higher intensity than the second point;

first threshold setting means for setting a first threshold value on the basis of a mean value of output of said difference signal obtained from each photoelectric conversion element;

second threshold setting means for setting a second threshold value to either one of the outputted difference signals of a photoelectric conversion element having the largest difference signal and two photoelectric conversion elements equally by spaced the predetermined number of pixels from the photoelectric conversion element having the largest difference signal;

selection means for selecting effective photoelectric conversion elements by comparing said first threshold value and said second threshold value with the difference signal generated by said difference signal generating means; and output means for outputting the difference signal obtained from the selected effective photoelectric conversion elements.

* * * * *

UNITED STATES PATENT AND TRADEMARK OFFICE
CERTIFICATE OF CORRECTION

PATENT NO. : 6,963,331 B1
APPLICATION NO. : 09/525021
DATED : November 8, 2005
INVENTOR(S) : Katsuyuki Kobayashi et al.

It is certified that error appears in the above-identified patent and that said Letters Patent is hereby corrected as shown below:

ON THE TITLE PAGE
At Item (57) Abstract, line 1, "The" should read --This--.
Line 4, "The" should read --The coordinate input--.
Line 6, "device" should read --device,--.
Line 7, "having" should read --consisting of a plurality of--.
Line 9, "in" should read --in a--.
Line 10, "in" should read --in a--.
Line 12, pixel" should read --pixels in each direction forward and backward from the pixel--.

COLUMN 1
Line 22, "an" should be deleted.

COLUMN 2
Line 4, "on" should read --on the--.
Line 16, "cameras," should read --cameras. Additionally,--.
Line 17, "and" should be deleted.
Line 18, "an" should be deleted.
Line 44, "when" should read --when a--.
Line 46, "voltage, but" should read --voltage. However in a structure that receives only low levels of light (i.e., CCD output is small),--.
Line 47, "satisfactorily" should read --satisfactorily,--.

COLUMN 2, CONT'D.
Line 48, "decreased, in a structure which receives only low levels" should be deleted.
Line 49, "of light (namely CCD output is small). To adjust" should read --decreased. Adjusting--.
Line 53, "required." should read --required. ¶ SUMMARY OF THE INVENTION--.
Lines 65-67, "Embodiments of the invention will now be described in detail with reference to the accompanying drawings, in which:" should be deleted.

COLUMN 3
Line 46, "showing a" should read --showing--.
Line 60, "OF" should read --OF THE--.
Line 61, "EMBODIMENTS" should read --EMBODIMENTS
  ¶ Preferred embodiments of the invention will now be described in detail with reference to the accompanying drawings.--.

UNITED STATES PATENT AND TRADEMARK OFFICE
CERTIFICATE OF CORRECTION

| | |
|---|---|
| PATENT NO. | : 6,963,331 |
| APPLICATION NO. | : 09/525021 |
| DATED | : November 8, 2005 |
| INVENTOR(S) | : Katsuyuki Kobayashi et al. |

It is certified that error appears in the above-identified patent and that said Letters Patent is hereby corrected as shown below:

COLUMN 4
Line 4, "displaying" should read --displaying an--.
Line 11, "beam 45," should read --beam 45 (FIG. 1),--.
Line 26, "References" should read --References herein--.
Line 43, "screen 10" should read --screen 10,--.
Line 48, "computer" should read --computer 200--.
Line 59, "information" should read --information,--.

COLUMN 5
Line 3, "memory" should read --memory,--.
Line 61, "element 41," should read --element 41 thereby--.

COLUMN 6
Line 24, "i.e." should read --i.e.,--.

COLUMN 9
Line 22, "Therefore" should read --Therefore,--.
Line 52, "unit 3," should read --unit 31,--.
Line 63, "detection output" should read --luminous energy--.

COLUMN 10
Line 11, "seen" should read --shown--.
Line 15, "CDROM" should read --CD ROM--.
Line 29, "Input" should read --The input--.
Line 30, "input, and" should read --input, and the--.
Line 67, "without" should read --without the--.

COLUMN 11
Line 19, "sensor" should read --sensors--.

COLUMN 12
Line 13, "focus" should read --the focus--.
Line 20, "degrees," should read --degrees (40°),--.
Line 49, "stores" should read --stores an--.
Line 52, "pixel" should read --pixel,--.

UNITED STATES PATENT AND TRADEMARK OFFICE
CERTIFICATE OF CORRECTION

PATENT NO. : 6,963,331 B1
APPLICATION NO. : 09/525021
DATED : November 8, 2005
INVENTOR(S) : Katsuyuki Kobayashi et al.

It is certified that error appears in the above-identified patent and that said Letters Patent is hereby corrected as shown below:

COLUMN 13
Line 16, "i.e." should read --i.e.,--.
Line 27, "if" should read --if a--.
Line 28, "together" should read --together the--.
Line 43, "(i.e." should read --(i.e.,--.
Line 49, "(n+1th)" should read --(n+1)th--.
Line 50, "subtracting" should read --subtracting the--.

COLUMN 14
Line 4, "situation.)." should read --situation).--.
Line 6, "first" should read --first,--.
Line 9, "sets" should be deleted.
Line 11, "unit" should read --unit 31--, and "of" should read --of the--.
Line 17, "no." should read --nO.--.
Line 27, "to" should read --to a--.
Line 28, "in" should read --in a--.
Line 30, "that" should read --that,--, and "S112" should read --S112,--.
Line 31, "level" should read --level,--.

COLUMN 15
Line 40, "element" should read --element,--.

COLUMN 16
Line 11, "cont" should read --count--.
Line 12, "cont" should read --count--, and "in" should read --in the--.

COLUMN 17
Line 9, "(x-1,Y-1)" should read --(X-1,Y-1)--.
Line 54, "in" should read --in the--.

COLUMN 18
Line 3, "$N^2$ pixels." should read --N2 pixels.--.
Line 22, "of" should read --of the--.
Line 42, "reach" should read --reach the--.
Line 46, "increasing" should read --increasing the--.

COLUMN 19
Line 4, "of" should read --of the--.
Line 15, "cont" should read --count--.

UNITED STATES PATENT AND TRADEMARK OFFICE
CERTIFICATE OF CORRECTION

| | |
|---|---|
| PATENT NO. | : 6,963,311 B1 |
| APPLICATION NO. | : 09/525021 |
| DATED | : November 8, 2005 |
| INVENTOR(S) | : Katsuyuki Kobayashi et al. |

It is certified that error appears in the above-identified patent and that said Letters Patent is hereby corrected as shown below:

COLUMN 20
Line 10, "making LED light emitting" should read --making the LED light emitted--.
Line 16, "cont" should read --count--.
Line 20, "where" should read --where the--.
Line 43, "a little" should be deleted.

COLUMN 22
Line 9, "having a" should read --having an--.

COLUMN 23
Line 32, "of the" should read --of a--.
Line 33, "of the" should read --of the same--.

COLUMN 24
Line 17, "comprising;" should read --comprising:--.
Line 55, "of the" should read --of a--.
Line 56, "of the" should read --of the same--.

COLUMN 25
Line 30, "of the" should read --of a--.
Line 31, "of the" should read --of the same--.
Line 53, "of the" should read --of a--.
Line 54, "of the" should read --of the same--.

UNITED STATES PATENT AND TRADEMARK OFFICE
CERTIFICATE OF CORRECTION

PATENT NO. : 6,963,311 B1
APPLICATION NO. : 09/525021
DATED : November 8, 2005
INVENTOR(S) : Katsuyuki Kobayashi et al.

It is certified that error appears in the above-identified patent and that said Letters Patent is hereby corrected as shown below:

COLUMN 26
Line 17, "of the" should read --of a--.
Line 18, "of the" should read --of the same--.
Line 42, "of the" should read --of a--.
Line 43, "of the" should read --of the same--.
Line 55, "by spaced" should read --spaced by--.

Signed and Sealed this

Fifteenth Day of August, 2006

JON W. DUDAS
*Director of the United States Patent and Trademark Office*